(12) United States Patent
Gierens et al.

(10) Patent No.: US 10,194,756 B2
(45) Date of Patent: Feb. 5, 2019

(54) LIGHT-EMITTING GLAZING ASSEMBLY, DOOR AND PIECE OF REFRIGERATING EQUIPMENT COMPRISING THIS ASSEMBLY AND MANUFACTURE THEREOF

(71) Applicant: SAINT-GOBAIN GLASS FRANCE, Courbevoie (FR)

(72) Inventors: Anne Gierens, Dusselforf (DE); Richard Wolff, Pronleroy (FR); Stéphane Dieu, Vignemont (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 95 days.

(21) Appl. No.: 15/310,336

(22) PCT Filed: May 13, 2015

(86) PCT No.: PCT/FR2015/051262
§ 371 (c)(1),
(2) Date: Nov. 10, 2016

(87) PCT Pub. No.: WO2015/173516
PCT Pub. Date: Nov. 19, 2015

(65) Prior Publication Data
US 2017/0143136 A1    May 25, 2017

(30) Foreign Application Priority Data
May 13, 2014  (FR) ...................... 14 54262

(51) Int. Cl.
*B32B 17/10* (2006.01)
*A47F 3/04* (2006.01)
(Continued)

(52) U.S. Cl.
CPC ............ *A47F 3/0434* (2013.01); *A47F 3/001* (2013.01); *A47F 3/043* (2013.01); *A47F 11/10* (2013.01);
(Continued)

(58) Field of Classification Search
CPC ........ A47F 3/0434; A47F 11/10; A47F 3/001; G02B 6/0095; G02B 6/0028;
(Continued)

(56) References Cited

U.S. PATENT DOCUMENTS 4,072,486 A * 2/1978 Joseph .................... A47F 3/043
                                                    62/131
5,910,083 A * 6/1999 Richardson ......... E06B 3/66366
                                                    312/116
(Continued)

FOREIGN PATENT DOCUMENTS

| DE | 20 2008 011 548 U1 | 1/2010 |
| JP | 2010-009845 A | 1/2010 |
| WO | WO 2012/168661 A1 | 12/2012 |
| WO | WO 2013/017792 A1 | 2/2013 |

OTHER PUBLICATIONS

International Search Report as issued in International Patent Application No. PCT/FR2015/051262, dated Jul. 3, 2015.

*Primary Examiner* — Joseph L Williams
*Assistant Examiner* — Jose M Diaz
(74) *Attorney, Agent, or Firm* — Pillsbury Winthrop Shaw Pittman LLP

(57) ABSTRACT

A light-emitting glazed door for a piece of refrigerating equipment, includes first and second glazing units forming an insulating glazing unit, the glazing units being spaced apart by a mastic seal; a peripheral light source with a source carrier; a system for extracting guided light in order to form at least one luminous zone; and a fastening part, namely a profile, making direct adhesive contact with the mastic seal.

27 Claims, 10 Drawing Sheets

Figure 3:
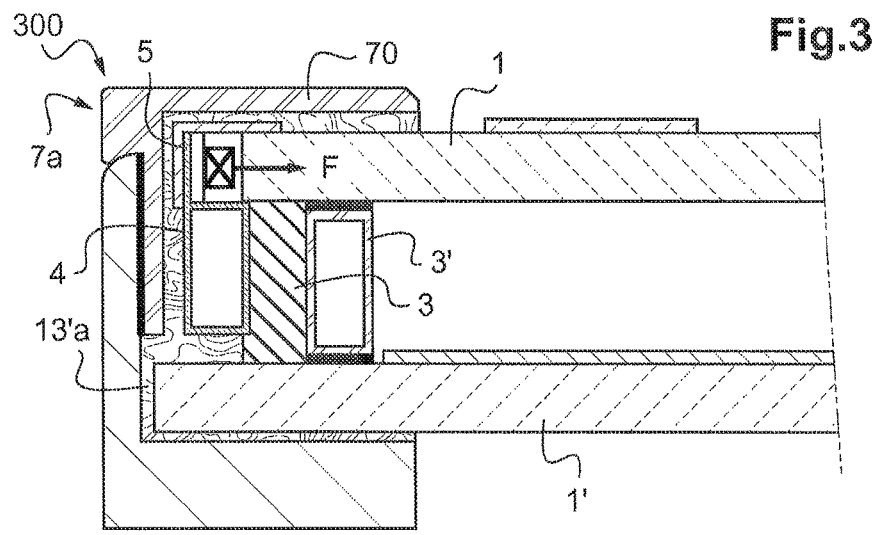
Figure 3:
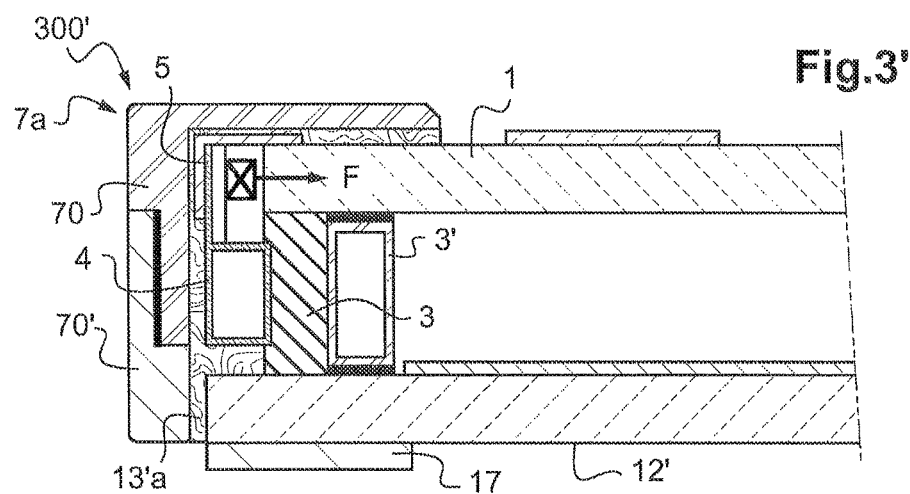

(51) Int. Cl.
  *A47F 11/10* (2006.01)
  *F21V 33/00* (2006.01)
  *F21V 8/00* (2006.01)
  *A47F 3/00* (2006.01)
  *F21W 131/301* (2006.01)
  *F21Y 103/10* (2016.01)
  *F21Y 115/10* (2016.01)
  *F21W 131/305* (2006.01)
  *F21Y 105/00* (2016.01)

(52) U.S. Cl.
  CPC .. *B32B 17/10055* (2013.01); *B32B 17/10541* (2013.01); *F21V 33/0016* (2013.01); *F21V 33/0044* (2013.01); *G02B 6/0028* (2013.01); *G02B 6/0065* (2013.01); *G02B 6/0085* (2013.01); *G02B 6/0086* (2013.01); *G02B 6/0093* (2013.01); *G02B 6/0095* (2013.01); *F21W 2131/301* (2013.01); *F21W 2131/305* (2013.01); *F21Y 2103/10* (2016.08); *F21Y 2105/00* (2013.01); *F21Y 2115/10* (2016.08)

(58) Field of Classification Search
  CPC ... G02B 6/0065; G02B 6/0085–6/0086; G02B 6/0093; F21V 33/0016; F21V 33/0044; F21Y 2105/00; F21Y 2115/10; F21W 2131/305; F21W 2131/301; F21K 9/00
  See application file for complete search history.

(56) References Cited

U.S. PATENT DOCUMENTS

| 6,059,420 | A * | 5/2000 | Rogers | A47F 3/0434 362/223 |
| 9,664,835 | B2 * | 5/2017 | Kleo | F21V 33/0012 |
| 9,801,474 | B2 * | 10/2017 | Trulaske, Sr. | A47F 3/001 |
| 9,863,693 | B2 * | 1/2018 | Seo | F25D 27/005 |
| 2004/0040228 | A1 * | 3/2004 | Emde | B32B 17/10165 52/173.3 |
| 2005/0081547 | A1 * | 4/2005 | Avenwedde | F21V 23/06 62/264 |
| 2005/0105303 | A1 * | 5/2005 | Emde | B32B 17/10045 362/616 |
| 2006/0005484 | A1 * | 1/2006 | Riblier | A47F 3/0434 52/204.5 |
| 2007/0133192 | A1 * | 6/2007 | Alessandro | A47F 3/0434 362/125 |
| 2008/0024047 | A1 * | 1/2008 | Juo | A47F 3/043 312/405 |
| 2009/0244884 | A1 * | 10/2009 | Trulaske, Sr. | A47F 3/001 362/94 |
| 2010/0180615 | A1 * | 7/2010 | Linder | A47F 3/0434 62/248 |
| 2011/0267833 | A1 * | 11/2011 | Verrat-Debailleul | B32B 17/10036 362/545 |
| 2012/0285089 | A1 * | 11/2012 | Artwohl | A47F 3/0434 49/70 |

* cited by examiner

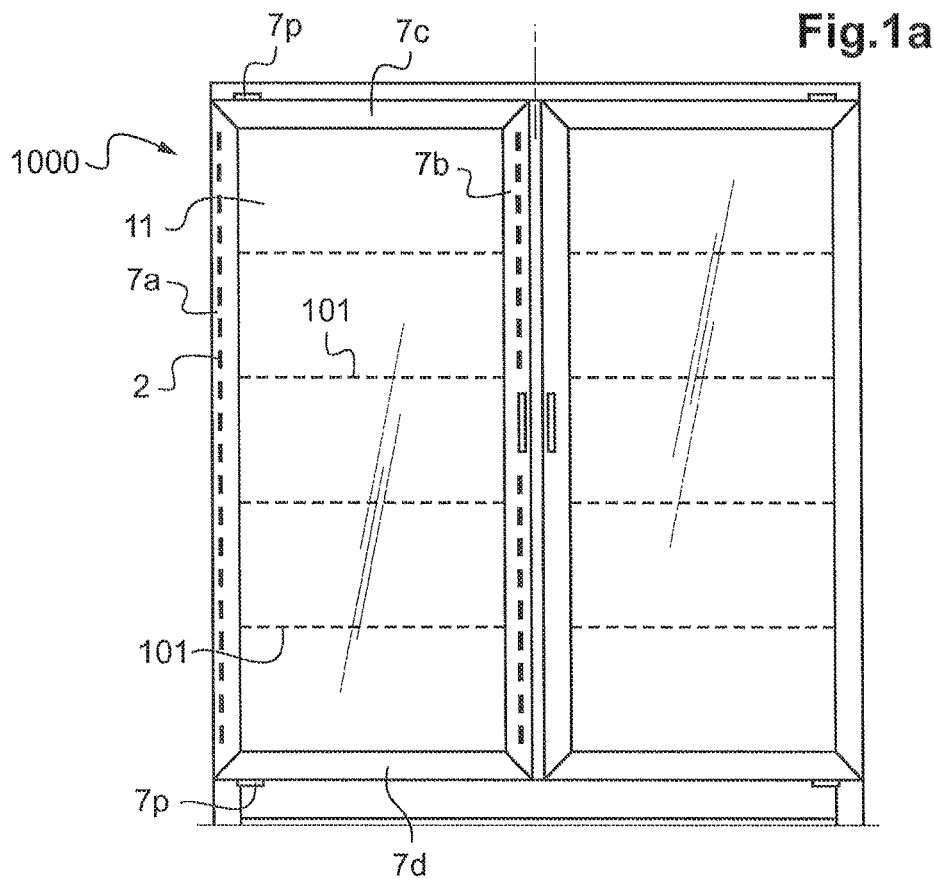
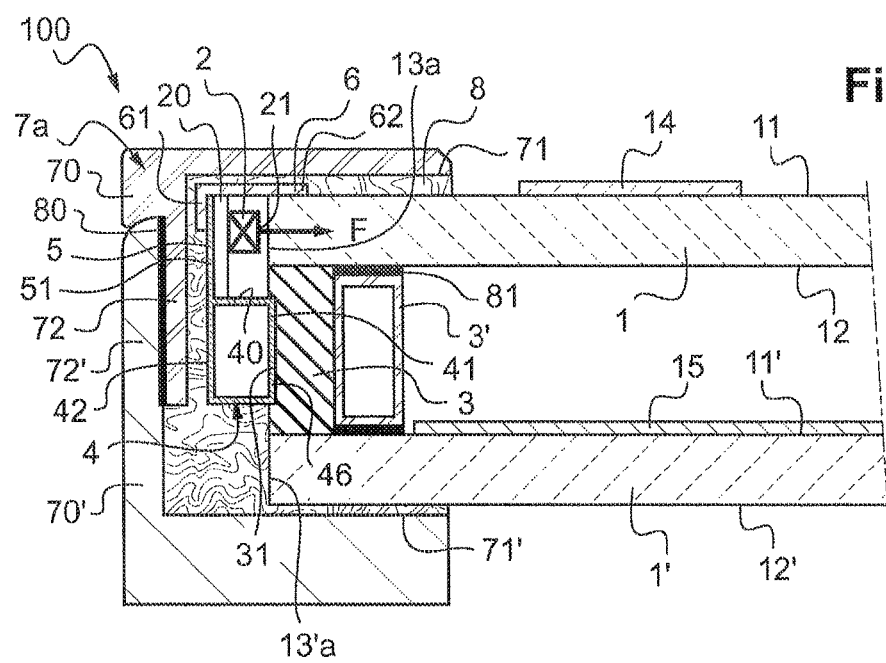

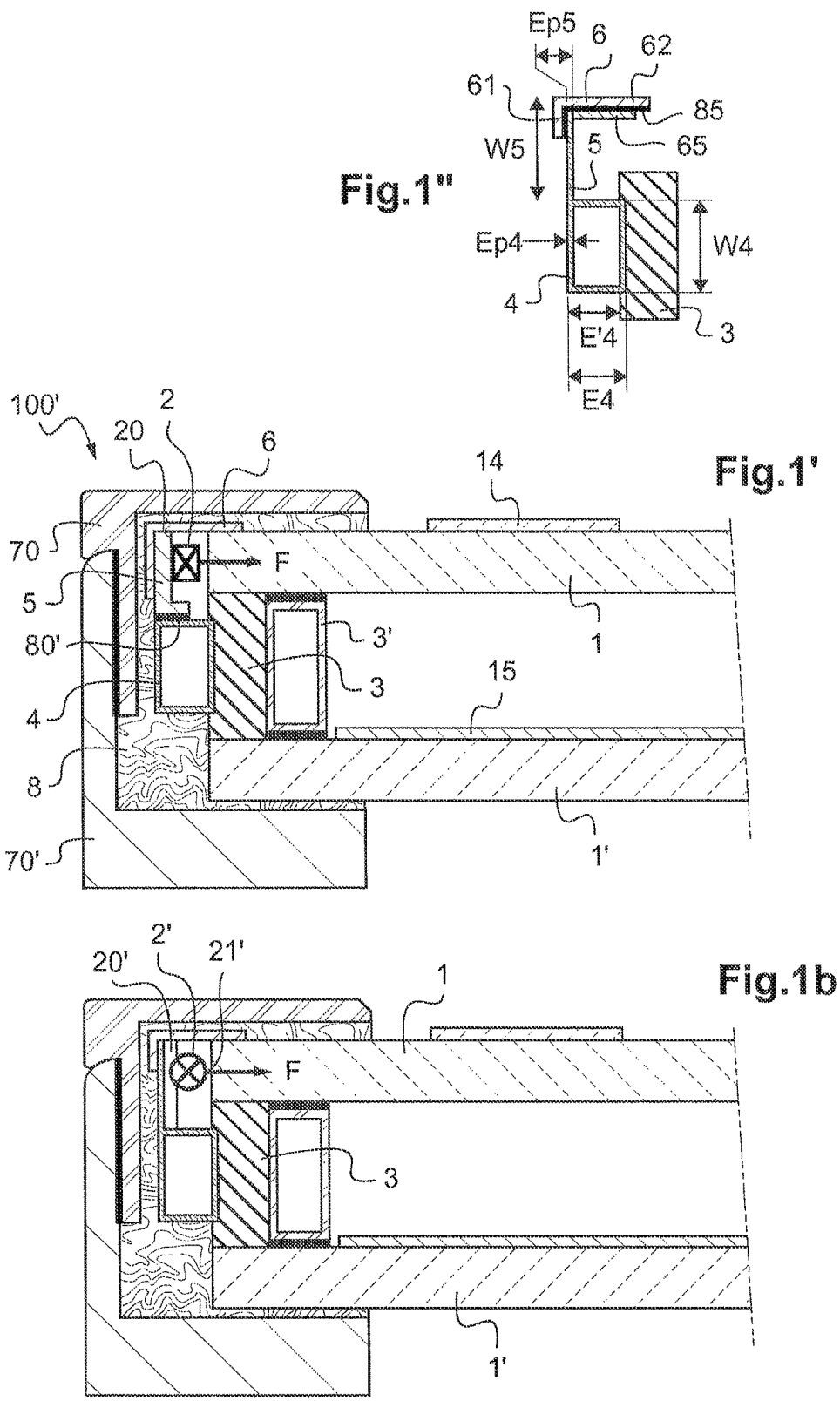

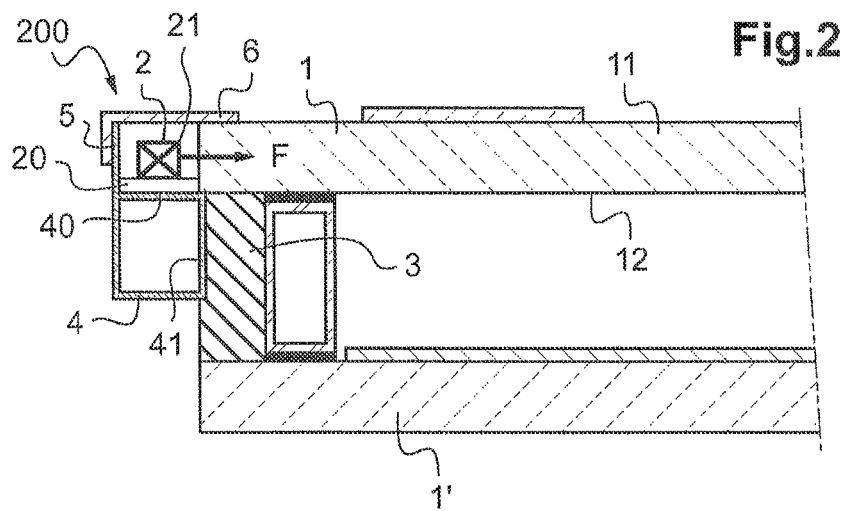
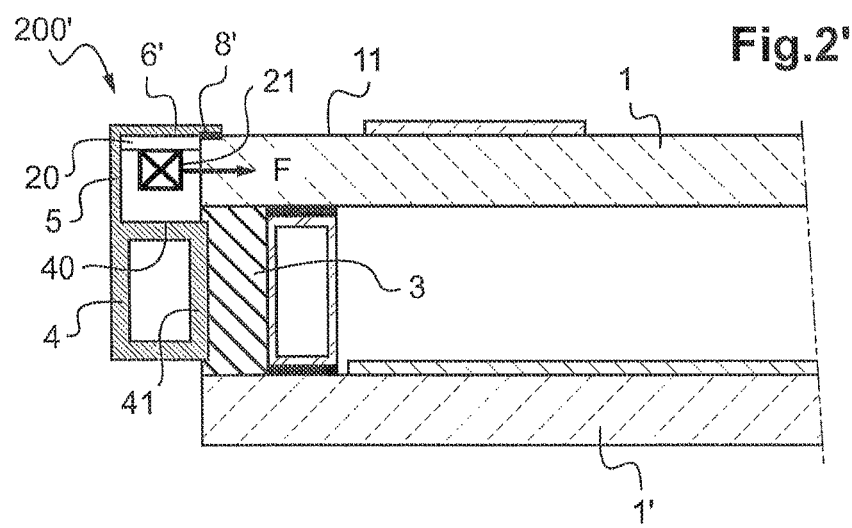
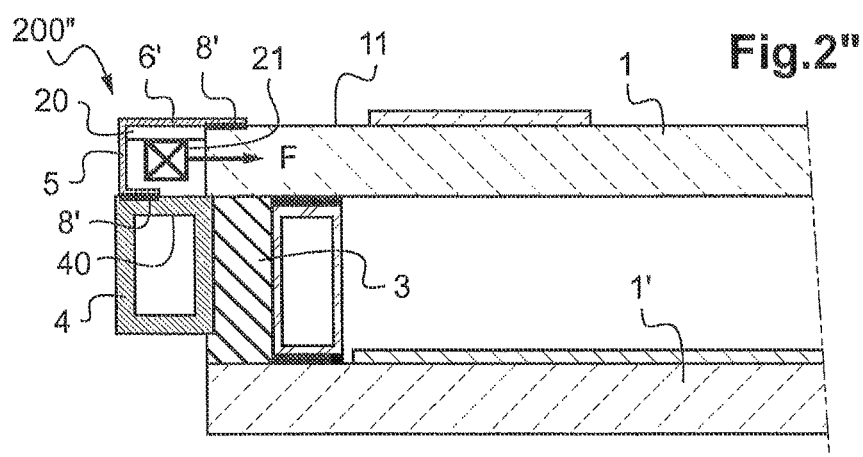

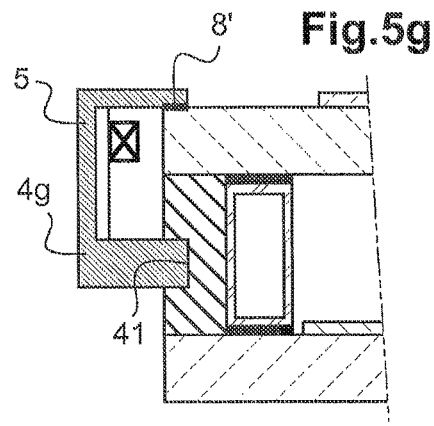
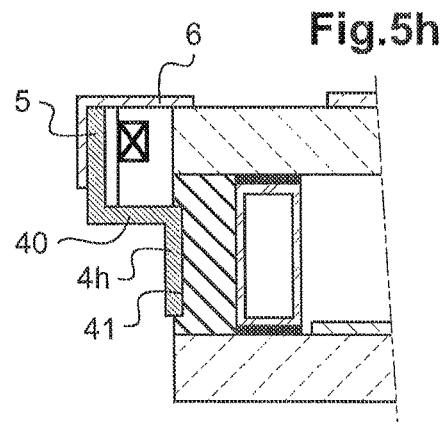
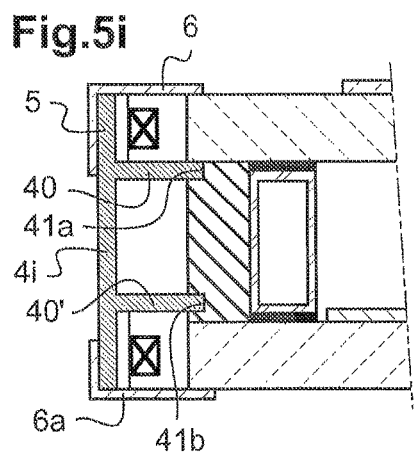
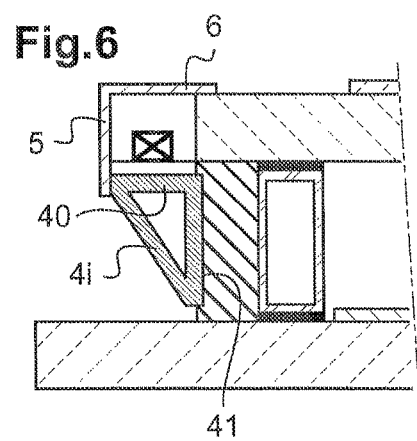
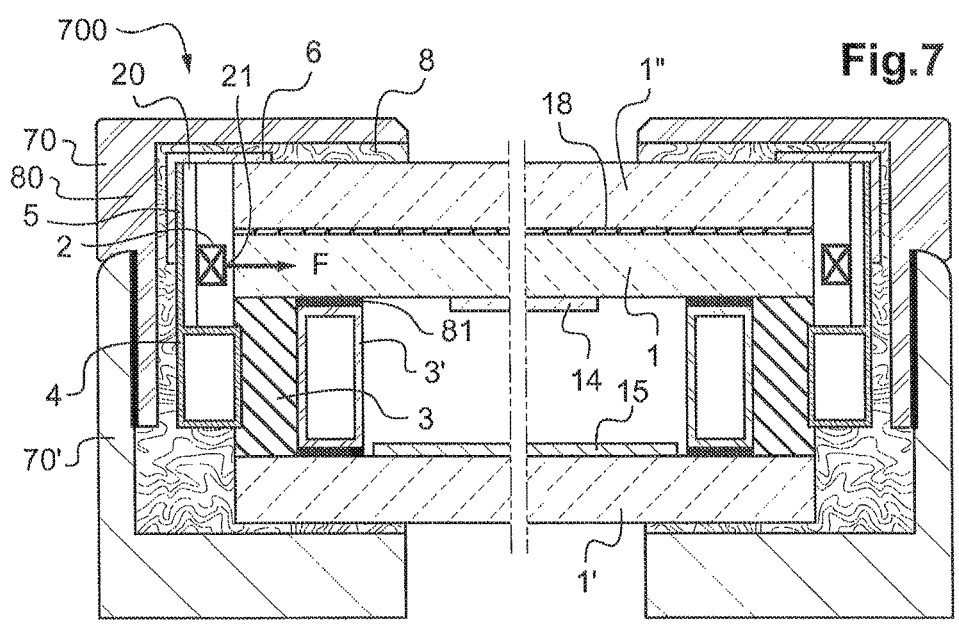

LIGHT-EMITTING GLAZING ASSEMBLY, DOOR AND PIECE OF REFRIGERATING EQUIPMENT COMPRISING THIS ASSEMBLY AND MANUFACTURE THEREOF

CROSS-REFERENCE TO RELATED APPLICATIONS

This application is the U.S. National Stage of International Application Serial No. PCT/FR2015/051262, filed May 13, 2015, which in turn claims priority to French Application No. 1454262, filed May 13, 2014. The contents of all of these applications are incorporated herein by reference in their entirety.

The present invention relates to insulating glazing units for doors of pieces of refrigerating equipment, and in particular to light-emitting glazing assemblies for doors of pieces of refrigerating equipment, to doors comprising such assemblies and to pieces of equipment comprising such doors, and to manufacture thereof.

An insulating glazing unit intended to form the entry of a refrigerated enclosure, in which enclosure cooled or frozen products, such as items of food or drinks, or any other type of product needing to be kept cold, for example pharmaceutical products or even flowers, are displayed, is known. The insulating glazing unit consists of at least two glazing substrates separated by a gas-filled cavity, at least one of these substrates being provided with a low-E coating.

When products kept in a refrigerated enclosure must remain visible, as is the case in many commercial premises at the present time, the refrigerated enclosure is equipped with glazed portions that convert it into a refrigerated "display", such "displays" commonly being referred to as "refrigerated display cabinets". There are a number of variants of these "displays". Certain take the form of cabinets and then it is the door itself that is transparent, others take the form of chests and it is the horizontal cover (door placed horizontally) that is glazed in order to allow its contents to be seen.

The light function is generally located inside the enclosure. More recently, in patent application WO 2013/017792 an illuminated door for a piece of refrigerating equipment has been proposed, said door comprising an insulating glazing unit and light-emitting diodes coupled optically to the edge of one of the two panes of the door the mounting profile of which contains a void for inserting the diodes via a cap masking this void in the profile.

Thus, the present invention relates to a light-emitting insulating glazing unit for a door of a piece of refrigerating equipment the light source of which is ecological and effective, robust and reliable (light-emitting diodes or one or more optical fibers coupled to one or more diodes for example) and which does not require the door profile to be modified.

For this purpose, the invention provides a light-emitting glazing assembly for a (glazed)—vertical or horizontal—door (therefore this term encompasses covers) for a piece of refrigerating equipment (cabinet, chest, etc.) comprising an insulating glazing unit having an internal main face (preferably on the equipment side and even the outermost of the main faces on the equipment side) and an external main face (preferably on the exterior/user side and the outermost of the main faces), the insulating glazing unit containing:

a first glazing unit comprising the external face and a first edge formed from (four) edge faces, said first glazing unit including a first glass sheet, having a first main fade and a second main face, made of glass and preferably of mineral glass (typically of refractive index lower than 1.65 at 550 nm), the first sheet preferably being rectangular (inclusive of square), the first face being the external face or the first sheet being laminated to another glass sheet (having said external face) or indeed the first glazing unit is the (single) central pane of a triple glazing unit (although this is less preferable than the case where it is an outermost external face of the glazing unit—with the internal face);

a second glazing unit comprising the internal face and a second edge formed from edge faces, said second glazing unit including a second glass sheet, preferably made of mineral glass, having a third face and a fourth main face, the second and third faces being spaced apart by a first gas-filled cavity (the gas being air or an inert gas), the fourth face being the internal face or the second sheet being laminated to another glass sheet (having said internal face) or indeed a third sheet made of glass (having said internal face) is spaced apart from the second sheet by a second gas-filled cavity (having on the periphery of the forth and fifth faces a second polymeric seal forming an especially rectangular frame);

on the periphery of the second and third faces, a first polymeric seal forming a (rectangular) frame, typically a mastic seal;

a light source external to the insulating glazing unit, said light source (comprising an emissive zone or emissive face preferably facing the injection edge face) preferably being chosen from:

(aligned) light-emitting diodes each comprising a semiconductor chip having an emissive face—preferred light source, and an optical fiber (coupled to a primary source such as a light-emitting diode) having a lateral portion forming the emissive zone, said light source being optically coupled to one of the edge faces, referred to as the injection edge face (the emissive zone or emissive face preferably facing the injection edge face), in order to propagate the (injected) light by total internal reflection in the thickness (all or some of the thickness especially if the first glazing unit is a laminated glazing unit) of the first glazing unit, which then plays the role of a light guide, the light source making contact with the injection edge face (preferably with a protective layer) or being spaced apart therefrom;

a source carrier bearing the light source and not extending beyond the first edge in the direction of the external face (and even the insulating glazing unit) and, which, for the diodes, is a (profiled, flat) printed circuit board (strip) that is preferably on a metal (aluminum, stainless steel, copper, silver, etc.) in order to dissipate heat;

preferably means for extracting the guided light, associated with the first glazing unit (preferably directly on a main face) and preferably with the first sheet—on the external face side or opposite—in order to form at least one luminous zone (these means for extracting light possibly being sold separately or in a light-emitting glazing assembly kit and/or being added by the user); and preferably at least a first layer providing a thermal function on the second sheet, better still on the third face facing the second face if it is a question of a double glazing unit and/or on the optional third sheet (if it is a question of a triple glazing unit) especially on the sixth face, the first sheet (preferably made of clear or extra-clear glass) preferably being devoid of layers providing thermal functions—said layer is separate from a light-extracting layer on the first face or the second face;
and the glazing assembly furthermore comprises:
  making direct adhesive contact with the (external edge face of the) first polymeric seal, a preferably metal part, referred to as a fastening part, adjacent to the injection edge face and that preferably does not make contact both with the first glazing unit and the second glazing unit, and, better still, does not make contact at least with the second glazing unit, this part especially being a part separate from an (additional) framing jamb—this part is a profile especially placed along the periphery of the injection edge face; and
  what is referred to as a bottom part, which is preferably made of metal or even metalized (or made reflective) and which is preferably securely fastened to and even of unitary construction with the fastening part, facing and spaced apart from the injection edge face—this part especially being separate from an (additional) framing jamb,
  the light source being housed between the bottom part and the injection edge face, the source carrier for the optical fiber possibly being the bottom part or the fastening part (making contact with the optical fiber) directly.

The fastening part, which is a profile, is easily fastened via the first seal to the insulating glazing unit during its fabrication, advantage being taken of the fact that the first seal may be used for this purpose when it is still in its adhesive state; for example, the part is fastened after the first seal has been applied and is still in its adhesive state (first method of manufacture) or once the seal material is deposited after the fastening part has been deposited (second method of manufacture). The profiled fastening part:
  allows the light source to be positioned correctly or it may even be placed thereon, facilitating optical alignment with the injection edge face (in particular for diodes); in particular the printed circuit board is placed on (against) the fastening part (i.e. there is no adhesive contact or even any type of permanent fastening therebetween) or the edge of the printed circuit board is against (against) the fastening part (i.e. there is no adhesive contact or even any type of permanent fastening therebetween);
  allows the conventional framing profile of the board not to be (substantially) modified especially if it is not required for the source to be demountable;
  makes it possible to mechanically protect the source (and even the source carrier) during mounting of the framing profile, in the first method of manufacture;
  participates in suppressing spreading pathways of the adhesive most often used to fasten the framing profile (horizontal insulating glazing unit) against the edge of the insulating glazing unit;
  makes mounting simpler than is the case with bores through the first seal or insets (Rawlplugs) in the first seal for housing screws that are fastened into an apertured part bearing the source carrier, as proposed in the light-emitting double glazing unit in patent application WO 2012/198661 (FIG. 2);
  possibly makes it possible to channel the light and better reflect it in order to minimize injection losses.

The fastening part is not an element such as a screw for attaching a part bearing the source or the source carrier, said bearing part being apertured for this purpose. It allows (with the bottom part and a cap) a cavity of suitable size (as small as possible) to be formed for housing the source and source carrier.

The fastening part, protruding from the first seal, may make with the first seal only direct adhesive contact (no adhesive between them). The fastening part, protruding from the first seal, may make direct adhesive contact with the first seal and be spaced apart from the first glazing unit and/or the second glazing unit (first method of manufacture in particular). The fastening part, protruding from the first seal, may make direct adhesive contact with the first seal and also be adhesively bonded (adhesive, double sided adhesive, etc.) to the border of the second face or even to the spacer, and even be adhesively bonded to the border of the third face (second method of manufacture in particular). If necessary, this adhesive serves to prevent there being a thermal bridge between the first and second glazing units.

A polymeric material is then preferred for the first seal, which material, while adhering well to the (especially mineral) glass for its sealing function, does not dry immediately (in particular for the first embodiment), for example in at least 15 min or in at least 30 min or in a few hours for example. For the material of the first seal (ensuring the mechanical strength of the glazing unit and its seal tightness to water) one of the following is preferably chosen:
  silicone;
  a (two-component) polyurethane;
  a (two-component) polysulfide; or
  a (one-component) hot-melt material.

The printed circuit board is not fastened directly to the external face (adhesive bonding, etc.) as this may damage it. If demountability is desired and/or by way of precaution, the printed circuit board is preferably a part separate from the fastening part and is not fastened to the first seal (and even does not make adhesive contact with the fastening part or any other non-demountable part).

The light source (and the source carrier such as the printed circuit board) is located between the injection edge face and a bottom part and a framing profile is fastened preferably by adhesive bonding to the insulating glazing unit, via the external face and/or the back face of the bottom part and/or even the back face of the fastening part, the edge of the second glazing unit and the internal face.

The light source (and the source carrier) is (are) located in a cavity bounded by the injection edge face, fastening part, bottom part (and a cap), said cavity especially not comprising the framing profile fastened preferably by adhesive bonding to the insulating glazing unit. The cavity is elongate, along the injection edge face (longitudinal cavity) and preferably opens laterally (on one or at the lateral ends of the bottom and fastening parts). Preferably the cavity is devoid of (optical) adhesive.

The fastening part is preferably of simple shape, a hollow or solid profile (freely manufactured: by extrusion, rolling, bending, etc.) and for example of closed and preferably rectangular (inclusive of square) cross section, such as a parallelepiped making adhesive contact with the first seal via its edge (or a lip) or via a main face.

Preferably, the glazing assembly comprises a cap closing a (laterally open) cavity bounded by the injection edge face, the fastening part and the bottom part, preferably against or securely fastened to the fastening part, said cavity housing the light source (and the source carrier, above all of the diodes) said closure following the longitudinal direction of the injection edge face, said cap preferably being made of metal (or metalized). The cap may even be an extension of the bottom part (itself optionally an extension of the fastening part) this assembly especially forming a U-shaped cross section turned toward the first glazing unit.

The cavity is preferably not closed laterally; it has one or more open lateral ends for the mounting and/or demounting of the light source.

The width of contact of the fastening part to the first seal (width of the face called the front face) is preferably at least 3 mm. There may be only one single area of contact, or this area of contact may be split into a plurality of zones. For example, there are a plurality of zones of adhesive contact (at least two zones) extending along the first seal, especially when the fastening part forms a C or a U turned toward the first seal, or even an E turned toward the first seal.

The fastening part (optionally the source carrier and especially the PCB directly) may optionally be partially anchored in the first seal, penetrating to a depth of preferably at most 3 mm, leaving at least, by way of precaution, preferably at least 1 mm and even at least 2 mm of thickness of first seal (in order not to pierce it).

The thickness (depth) E4 of the fastening part protruding from the injection edge face is for example at most 5 mm and better still at least 3 mm in order to facilitate the placement of the source and (optional) source carrier. The first seal is preferably at least 4 mm in thickness and especially 6 mm±1 mm in thickness (standard thickness).

The external edge face of the first seal may be right or concave, may be set back (preferably by at most 4 mm) from the injection edge face or be flush with or even extend beyond the injection edge face.

The distance between the second and third face is preferably at most 20 mm, and at least 5 mm or 8 mm and generally 10 mm (±0.5 mm) or 14 mm (±0.5 mm) (standard dimensions).

The fastening part may be a folded or extruded part, such as a metal plate (of aluminum, etc.) of plate thickness Ep4 of at least 0.4 mm and even at least 1 mm and even better still of at least 1.5 mm if mechanical strength is desired (first method of manufacture in particular).

The term "profile" is understood to mean an elongate part (longer than it is wide) of preferably constant profile:
 that, for the fastening part, extends along the periphery of the injection edge face (plumb with the edge face) and more precisely along the first seal and making direct adhesive contact with the first seal (in one or at least two elongate contact zones); and
 that, for the bottom part, extends along the injection edge face.

When the profile is a rectangular bar it is a thin (but still elongate) part.

The rectangular or L-shaped (cross section of the) fastening part preferably has a large side making contact with the first seal (front face) and a small side (lateral portion) on the injection edge face side in order to obtain a larger width of adhesive contact with the first seal and/or limit protrusion of the part.

The width W4 of the fastening part is between 5 and 8 mm (which especially corresponds to the width of adhesive contact with the first seal) and better still is at least smaller than the thickness of the first seal, a lateral portion (parallel to the first face and perpendicular to the front face adhesively bonded to the first seal) for example preferably being offset by at least 1 or 2 mm from the second face above all if the first glazing unit is a single glazing unit (of about 4 mm) because this allows the source carrier, typically of 5 mm width for a PCB (printed circuit board) carrier, to be more easily housed in its entirety, especially facing the injection edge face (against the bottom part) in the case of top-emitting diodes.

Preferably, the fastening part and/or the bottom part or even the second edge protects the light source from misalignment and/or from being crushed against the injection edge face especially during the mounting of a framing profile (first method of manufacture).

Regarding the function providing (mechanical) protection of the source, the fastening part (profile, etc.) or the second edge (extending beyond the injection edge face) may protrude past the source carrier or the optical fiber directly on the bottom part, said protrusion being on the opposite side to the injection edge face.

The solid or hollow fastening part thus protects the source carrier and/or the source. The second glazing unit, which is preferably at least 3.8 mm in thickness, may protrude by at least 1 mm and better still at most 5 mm past the source or the source carrier (which, if it is required, is behind, further removed from the injection edge face than the source) and has a flat (and even polished for example) or even rounded edge.

The injection edge face is preferably flat or even rounded.

For mechanical protection purposes, the fastening part is for example a metal such as aluminum or stainless steel or even a plastic (such as Plexiglas rather than Teflon) said plastic preferably being coated with a coating that reflects light from the source (metal, etc.). Furthermore, the fastening part is preferably of a thickness Ep4 of at least 1 mm and better still at least 1.5 mm in order to mechanically protect the source if the fastening part is hollow, and of closed, especially rectangular (inclusive of square) or trapezoidal, cross section or of open cross section; if it is of open cross section it may be L-shaped (or form an H or C turned toward the first seal or a C turned away from the first seal).

The fastening part may furthermore, cumulatively or alternatively:
 be reflective (especially specular reflection) and made of metal or a white reflector (scattering layer such as a coat of paint, etc.);
 not be very bulky: total thickness E4 of preferably at most 15 mm and even 10 mm or 8 mm in order to limit the increase in thickness (if the part is solid); and
 preferably be of closed cross section.

The back face of the fastening part (opposite the front face making contact with the first seal)—to which pressure is applied parallel to the first face—may preferably be planar or even contain a blind (central) cavity curved toward the first seal.

The fastening part may comprise an unangulate back face having a flat surface of total width of at least 1 mm and even 3 mm. The width is cumulative if the surface contains a cavity (flipped C or H at 90°).

The source carrier (preferably a PCB) may be planar:
 and make (preferably nonadhesive) contact with a planar portion (wall) of the fastening part, for example parallel to the first face;
 and even make (preferably nonadhesive) contact with a planar portion (wall) of the bottom part, for example perpendicular to the first face;
 and even better still make (preferably nonadhesive) contact with a planar portion (wall) of a cap, parallel to the first face.

The shape and size of the fastening part may be relatively freely chosen provided that it protects from lateral ingress of adhesive (of the adhesive that is used to fasten the framing profile to the insulating glazing unit) between the source (preferably diodes) and the injection edge face, and, if it bears the source, that it prevents misalignment during drying. The fastening part for example has a cross section that is:

- L-shaped (large side against the first seal preferably) or C-shaped (aperture on the side of the first seal or preferably on the opposite side in order to provide two points of contact); or
- the same shape as an H shifted by 90°.

When the second glazing unit protrudes in order to protect the source (preferably diodes), the fastening part may be any shape and size provided, if it bears the source, that it prevents misalignment during drying and that it preferably protects from lateral ingress of adhesive between the source and the injection edge face—it is for example a part the cross section of which is a right angled triangle (hypotenuse on the second-sheet side).

More broadly, the fastening part/bottom part assembly and cap is preferably dimensioned and arranged to protect (the source carrier and) the source from the adhesive during the mounting of the framing profile (first embodiment). If the adhesive is present in a corner between the injection edge face and an adjacent edge face, it is preferable to complement the protection with an additional lateral part on the lateral end.

The cumulative thickness of the diode carrier and diodes is preferably at most 5 mm, and even at most 3 mm.

Preferably, the diodes are not fastened to the injection edge face (adhesive or double-sided adhesive tape) or then must be pre-encapsulated.

The fastening part may be a right part on a single edge face of the insulating glazing unit.

The fastening part may also be a part bent at an angle to form an L for fastening to the first seal and also to an edge face of the glazing unit separate from and adjacent to the injection edge face.

The fastening part may also be a frame made of a plurality of (abutting) parts, for example two parts forming an L or four parts.

Specifically, it is desired to provide illumination via the injection of light into two adjacent edge faces, into two opposite edge faces or into three or four edge faces.

Preferably, at least one edge face is illuminated—for example a longitudinal (vertical for a conventional enclosure door) or lateral (horizontal for an enclosure door) edge face—the opposite edge face being illuminated depending on the width of the glazing unit, on the uniformity and the desired power.

Preferably, to prevent a thermal bridge, if the fastening part is made of metal it will not make contact both with the first glazing unit and the second glazing unit.

To provide optimal protection from the adhesive and/or mechanical protection, the fastening part is preferably of length $L1$ at least substantially equal to the length $L$ of the injection edge face or at least to the length of the light source, if on a limited zone of the injection edge face. The source carrier (preferably a PCB) is of length smaller than or equal preferably to $L1$ (absent from corner zones, without adhesive) and preferably slightly smaller than or equal to $L$.

A metal heat sink under the source carrier may be the fastening part, the bottom part or a cap.

In the case where an optical fiber is used the source carrier may be the fastening part and/or the bottom part directly.

In the case where diodes are used, it is preferably a separate part from the fastening and bottom part, possibly a printed circuit board (PCB) whether made of metal or not ("FR-4" board) and preferably a rectangular bar unless the board is directly in the first seal and is not on a metal.

With top-emitting diodes, the diode carrier which is preferably against the back part (without adhesive contact, demountable) may touch (even abut against), via its edge, the lateral face of the fastening part. The source carrier (printed circuit board) is preferably of width smaller than the thickness of the injection edge face plus 1 mm.

With side-emitting diodes, the emissive faces face the injection edge face and the source carrier (printed circuit board), parallel to the external face and preferably against the fastening part, plays the role of a heat sink or is even merged with the fastening part (undemountable design in this case).

Preferably, the light source extends along the injection edge face in order to prevent dark zones from forming. The length of the light source is substantially equal to the length of the injection edge face.

The bottom part is preferably alternatively or cumulatively:

- made of metal and thick if it plays the role of a heat sink (back of the source carrier or making contact with the source carrier);
- reflective in order to redirect the rays and especially made of metal or a metalized (preferably hard) polymer;
- a profile such as a rectangular bar;
- of simple shape: of rectangular cross section (extended by an optional cap); and
- has an internal wall facing the planar injection edge face, parallel to the mid-plane of the first sheet.

The bottom part is preferably of length $L5$ at least substantially equal to the length $L$ of the injection edge face (absent from the corner zone, without adhesive) and preferably slightly smaller (by at most 20 mm or equal to $L$) and better still substantially equal to the length $L4$ of the fastening part.

The bottom part is preferably of thickness $Ep5$ of at least 0.8 mm and even of at least 1 mm and better still of at least 1.5 mm and preferably for example a metal plate (aluminum etc.), $Ep5$ possibly being equal to $Ep4$ (part of unitary construction in particular and with an optionally separate cap).

The bottom part preferably forms a lateral projection that may be flush with the back face of the fastening part or even is closer to the injection edge face.

The width $W5$ of the bottom part may be slightly larger than the thickness of the first sheet (above all if the first glazing unit is single) in order to house the top-emitting diode carrier entirely, typically of width $W2$ of 5 mm.

The bottom part may be a right fastening part on a single insulating glazing unit edge face.

Just like the fastening part, the bottom part may also face an edge face of the glazing unit separate from and adjacent to the injection edge face, or even other edge faces:

- part bent at an angle forming an L;
- or parts that abut (at the corner, etc.) for fastening to the first seal and also to an edge face of the glazing, unit separate from and adjacent to the injection edge face;
- or a frame made of one part (bent at an angle at the four corners) or of a plurality of abutting parts.

Specifically, it is desired to provide illumination via the injection of light into two adjacent edge faces, into two opposite edge faces or into three or four edge faces.

For the sake of simplicity, the bottom part is preferably against and better still (for seal-tightness against the adhesive) securely fastened to the fastening part even though it may also be against and better still (for seal-tightness against the adhesive) securely fastened to the second glazing unit, especially if the second glazing unit protrudes (in order to provide mechanical protection).

Advantageously, for the sake of simplicity, the bottom part extends the fastening part these two parts then forming a preferably metal (or plastic, especially metalized plastic) part of unitary construction, especially a bent plate—made of aluminum—said bottom part especially forming a lateral projection of the fastening part.

When the second edge extending beyond the injection edge face protrudes past the source carrier or the optical fiber directly on the bottom part, said protrusion being on the opposite side to the injection edge face, and the source carrier makes direct adhesive contact with the first seal, optionally merged with the fastening part. In particular, the source carrier is a printed circuit board and the source side-emitting diodes.

The source carrier, especially a printed circuit board or PCB, may preferably be in a cavity (opening laterally) formed by the injection edge face, the bottom part and the fastening part, and makes nonadhesive contact with the metal bottom part and/or the metal fastening part, and may even be borne by the metal cap which may be demountable or even a cap extending the metal bottom part.

The source carrier, especially a printed circuit board, may make, in the cavity bounded by the injection edge face, the bottom part and the fastening part (and the cap), nonadhesive contact with the preferably metal bottom part and/or the preferably metal fastening part and even not be (mechanically, magnetically, etc.) fastened to the preferably metal bottom part and/or to the fastening part and even not be (mechanically, magnetically, etc.) fastened to the cap.

The cross section of the cavity may be square or rectangular. The walls bounding the cavity (excluding the injection edge face), which are formed by the cap/bottom part/(the lateral portion of the) fastening part, may form a U (made up of one part or two parts) turned toward the glazing unit, a C turned toward the glazing unit, (the lateral part of) the fastening part being spaced apart from the second face by the first seal or by an adhesive.

The source carrier (printed circuit board) is preferably not embedded in a polymeric encapsulation (and with the diodes).

The source carrier and/or the optical fiber is then simply against the bottom and/or fastening part, which is optionally spaced apart from the injection edge face.

Preferably, before installation of the framing profile (with adhesive), a cap may be added preferably against or securely fastened to the fastening part, said cap closing a cavity (opening laterally) bounded by the injection edge face, the fastening part and the bottom part and housing the light source (and the source carrier, above all of the diodes) said closure following the longitudinal direction of the injection edge face, said cap preferably being made of metal (or metalized). The cavity is not closed laterally: it has open lateral ends.

It is not necessary to demount the cap even if it is desired to demount the source (the source is demountable laterally). The cap may therefore be fastened (one or two sides) as it is not intended to be demountable.

In a first (preferred) embodiment, the cap may be made of metal (aluminum), or of metalized plastic (or of plastic coated with another layer that reflects light), said cap being against or adhesively bonded (double-sided adhesive tape, adhesive) to the external face (typically over at most a width of 15 mm from the injection edge face) thereby increasing thickness by at most 1.5 mm and even of most 1 mm or even of at most 0.5 mm. Specifically, the distance between the first glazing unit and the framing profile must not become too great.

The cap is preferably at most 250 µm and even 100 µm or 50 µm in thickness.

The cap may be flexible; the source (diodes preferably) carrier is then preferably against the bottom part or the fastening part.

The cap and the bottom part and even the fastening part may form a preferably metal part of unitary construction.

The cap may be made of preferably metalized plastic (or plastic coated with another layer that reflects light) or metal, one of its or its ends or all of its surface especially being coated with an adhesive, the cap comprising a portion adhesively bonded to the external face increasing thickness by at most 1 mm and even of at most 0.5 m or of at most 0.2 mm (double-sided tape or adhesive) and extending to form the bottom part against or adhesively bonded to the fastening part. The bottom part is preferably against or adhesively bonded to the fastening part, or the bottom part is spaced apart from the fastening part and extends in order to be against or adhesively bonded to the second glazing unit.

Furthermore, the second edge may protrude past the source carrier or the optical fiber directly on the bottom part, said protrusion being on the opposite side to the injection edge face.

The cap may extend the bottom part, which is then bent at an angle, the fastening part/bottom part/cap assembly being a metal part of unitary construction, the end of the cap being against the first face with or without fastening means (adhesive, etc.). It is preferable for Ep4 to be at least 1 mm and better still at least 1.5 mm (mechanical protection) and for the cap to increase thickness by at most 1 mm on the external face. It may be a question of an extruded part.

The cap may extend the bottom part, which is then bent at an angle, the fastening part/bottom part/cap assembly being a metal part of unitary construction, the end of the cap (border of its main face on the glazing unit side) preferably being against (placed on) the external face (generally the first face)—with or without adhesive or any fastening means facilitating its placement. The source and/or the source carrier are then mounted (by sliding) via a lateral (open) end of the open cavity of the source.

Preferably, provision is made for at least one of the following features:
- the fastening part/bottom part/optional cap assembly is associated with the insulating glazing unit without creating a thermal bridge;
- the fastening part/bottom part/optional cap assembly is a metal or metalized reflector; and
- there is another injection edge face (other sources and fastening and bottom parts and even a cap) opposite the injection edge face and preferably on an edge face of the first sheet (if the first glazing unit is laminated).

Preferably, at least one longitudinal edge face (vertical edge face for a conventional enclosure door) is illuminated, the opposite edge face possibly being illuminated depending on the width of the glazing unit. Of course, it is possible to duplicate the means and to thus provide similarly or identically a second fastening part, a second bottom part, a second cap, a second source carrier and a second light source, in order to provide illumination via the injection of light:
- into the edge face of the first sheet adjacent to the injection edge face (lateral edge face for example); or
- into the edge face of the first sheet opposite the injection edge face (longitudinal edge face for example).

All of these means may even be provided on each edge face of the first sheet.

Of course, it is possible to duplicate the means and to provide similarly or identically in this way a second fastening part/second bottom part/second cap/second source carrier/second light source, in order to provide illumination via the injection of light into that edge face of the second sheet which is adjacent to the injection edge face and/or into that edge face of the first sheet which is opposite the injection edge face (longitudinal edge face for example).

The second fastening part may be adhesively bonded to the first, which is then therefore smaller in width, for example two times smaller in width, so that both parts only face the first seal.

Alternatively, the second fastening part is merged with the fastening part.

If needs be (for future addition of diodes), the fastening profile may comprise an identical or similar lateral extension on the second face side (of smaller width if the glass sheet is less thick for example) opposite the bottom part, this assembly being of unitary construction with the fastening part forming a central body, which is preferably of rectangular cross section, and the bottom part and the extension being two symmetrical flanges, especially bars of rectangular or even L-shaped cross section (lip toward the internal face of the glazing unit).

In the present invention, the term adhesive bonding implies an adhesive or a double-sided adhesive tape; the term adhesive by itself does not cover a double-sided adhesive tape.

Preferably, the glazing assembly contains a framing profile comprising a framing jamb, facing the injection edge face and on at least the internal face or the external face, said profile being fastened to the insulating glazing unit by adhesive bonding and preferably by what is referred to as a mounting adhesive (rather than a double-sided adhesive tape, at least to the two panes). Thus, it preferably makes adhesive contact via the adhesive with the (back face of the) fastening part, and even makes adhesive contact via the adhesive with the (back face of the) bottom part and the (back face of the) cap.

The optional mounting adhesive is absent from the space between the light source and the injection edge face (in the cavity housing the source carrier and the source).

The framing profile is preferably associated with the insulating glazing unit without creating a thermal bridge. Preferably it has a metal portion on the external face.

The framing jamb preferably comprises:
- an especially metal first portion (bent at an angle, of L-shaped cross section, etc.) facing the injection edge face and extending therebeyond on the external face, which portion is adhesively bonded to the external face and preferably adhesively bonded to the fastening part—which is offset from (does not face) the second glazing unit;
- and an especially thermally insulating and preferably polymeric second portion securely fastened by adhesive bonding means to the first portion, facing the second edge adjacent to the injection edge face and optionally extending therebeyond onto the internal face (adhesively bonded to the internal face).

One of the portions is made of metal (preferably the first portion, on the user side) the other being thermally insulating and preferably polymeric (preferably the second portion, on the enclosure side).

The first or second portion may contain a hollow zone.

In one advantageous embodiment, the second edge extends beyond the injection edge face and preferably protrudes past the source carrier or the optical fiber directly on the bottom part, said protrusion being on the side opposite the injection edge face, the framing jamb does not comprise a lip on the internal face, and especially is of L-shaped cross section, and the internal face comprises means for masking the first seal (and the adhesively bonded, generally metal, spacer), said masking means preferably being made of a mineral material such as an enamel of optical density of at least 2 and even of at least 2.5.

The framing profile may be a frame preferably made up of a plurality of parts (that are bent at an angle or abut, especially in the corners of the insulating glazing unit; are beveled; etc.).

The framing profile may furthermore comprise, preferably the horizontal jamb, especially on a jamb of an edge face adjacent to the injection edge face (the injection edge face preferably being longitudinal and vertical when mounted and the adjacent edge face preferably being horizontal and the top edge face when mounted) and a void capped with an apertured impermeable cover (a flat part for example) and with sealing means (preventing infiltration of any condensation on the glazed door), this assembly preferably allowing electrical power cables to be run to the source, the cap and/or the sealing means (seal etc.) being removable and forming an access flap allowing access to the source, there being no mounting adhesive between this flap and the source housed in the cavity that opens laterally, i.e. there is no adhesive contact or at least permanent fastening).

The void and the aperture are dimensioned in order to allow the source and preferably its source carrier, such as the printed circuit board separate from the bottom part, to be removed.

The source is for example removable using said cables laterally to the cavity.

The cover may be a part fastened, preferably by adhesive bonding, to the framing profile and furthermore comprising a pivot (for a door opening outward from the enclosure).

The profile may preferably be adhesively bonded with an adhesive to the insulating glazing unit and the adhesive is absent between the access flap and the lateral end closest to the open cavity.

If the door is a lid of a chest refrigerator in particular, the glazing units may be curved and thus it is preferable for the framing profile to be made of a flexible material in order to match the curvature.

The invention naturally also relates to a door of a piece of professional refrigerating equipment (cooled to a temperature above or below 0° C.) comprising a light-emitting glazing assembly such as described above and to a refrigerated enclosure having such a door.

Preferably, the injection edge face is the longitudinal edge face which is vertical after installation of the door, the void being in a framing jamb facing a lateral edge face that is the top edge face after installation of the door. The door preferably opens (outward from the enclosure) and comprises for this purpose a pivot on top of the top framing profile.

The enclosure may comprise two or more glazed doors.

Naturally, the insulating glazing unit may comprise the following by way of a layer providing a thermal function:
- an anti-frost layer;
- and/or a low emissivity or "low-E" layer (multilayer containing silver and preferably a single layer of silver), preferably on the second face in a double glazed version (the first glazing unit optionally being laminated and the second glazing unit preferably being single) or a triple glazing unit and even on the internal face for the triple glazing unit;

and/or a heating layer, on the internal face for the triple glazing unit.

For a cavity of given width (preset bottom part-injection edge face distance) the invention allows the diode to be correctly positioned relative to the injection zone of the light.

The face or emissive zone (for the diode, preferably a pre-encapsulated chip—encapsulation made of silicone, etc.) may be controllably placed the smallest possible distance away from the injection edge face without risk.

Preferably, the placement of the source carrier (and preferably the cap, independently of whether or not it bears the carrier) does not involve any strain as this causes too substantial a deformation and thus does not allow a precisely controlled position to be obtained: there is not a single possible position, but a plurality.

Preferably, any even reversible adhesive system (adhesive) is avoided as is any forceful mounting of the source carrier.

The diode carrier at least (or even the chips) is (are) provided, advantageously before its (their) integration into the glazing unit (during manufacture, etc.), with at least one mono or multilayer protective layer protecting from moisture and/or an encapsulation such as a silicone, epoxy or acrylic resin.

More precisely, the protective layer protects at least one printed circuit and solder joints and connectors if they are not impermeable.

The diodes (at least the emissive face) are preferably not protected in this way if already covered (pre-encapsulated) with silicone.

The strips of LEDs are protected before they are integrated into the housing. The protection may be a protective (silicone, epoxy, acrylic, etc.) resin, encapsulation or "potting" of the strip of LEDs (silicone, epoxy, acrylic, etc.).

Mention may be made of the conformal coatings based on acrylic or PU or silicone sold by Syneo and the "Novec Electronic coating EGC 1700" from 3M.

Mention may be made of the Abchimie protective coating. The deposition technique used is dip coating, selective deposition or vaporization (layers of 25-50 microns).

Preferably, the distance between the emissive face or emissive zone (which is optionally spaced apart from the edge) and the injection edge may be smaller than 2 mm.

The diodes may be (pre)encapsulated, i.e. comprise a semiconductor chip and a package, for example made of an epoxy resin or of PMMA, encapsulating the chip, and which may provide one of the following functions: scattering or focusing element or wavelength conversion. The package is common or individual.

The diodes may preferably be single semiconductor chips, for example about one hundred microns or one mm in size.

The diodes may optionally comprise an (optionally temporary) protective package in order to protect the chip during handling or to improve compatibility between the materials of the chip and other materials.

The diodes may especially be chosen from at least one of the following types of light-emitting diodes:

side-emitting diodes, i.e. diodes that emit parallel to (the faces of) their electrical contacts, having lateral emissive faces relative to the carrier; and diodes the main emission direction of which is perpendicular or oblique relative to the emissive face of the chip.

The diode carrier profile may be a conventional PCB or be made of metal.

The diode carrier profile may have a rectangular cross section.

The total number of diodes and the power of the diodes are chosen depending on the size and location of the zones to be illuminated, on the desired light intensity and on the uniformity of light required.

The length of the diode carrier profile varies depending on the number of diodes and the extent of the area to be illuminated.

Preferably, the transmission factor of the first sheet around the peak of the radiation of the chips (perpendicular to the main faces) is higher than or equal to 50%, even more preferably higher than or equal to 70%, and even higher than or equal to 80%.

Provision may preferably be made for the one or more coupling edge faces of the first sheet to have rounded edge faces. In particular, in the case where the space into which the radiation is emitted is filled with air, it is possible to take advantage of refraction at the first sheet of suitable geometry/air interface (rounded or even beveled, etc. edge face) thus allowing the rays to be focused in the first sheet.

The glass may optionally have undergone beforehand a heat treatment, such as a toughening, annealing, tempering or bending heat treatment.

The edge face of the first sheet of the insulating glazing unit may be cut (trimmed to form voids before tempering) in order to house the diodes therein.

The first and/or second sheets may be of any shape (rectangular, square, round, oval, etc.), and be planar or curved.

The first sheet may preferably be made of soda-lime glass, for example the glass PLANILUX from SAINT GOBAIN GLASS.

The means for extracting the light guided by the first and/or second main face are scattering means on the surface of the first and/or second main face or scattering means in the bulk of the first sheet.

To extract the light, scattering means are employed, these means either being formed by a treatment of the surface of the glass sheet, such as sandblasting, acid etching, deposition of an enamel or of a scattering paste, or by a treatment of the bulk of the glass, such as laser etching.

The scattering particles may be chosen from semitransparent particles and preferably mineral particles such as oxides, nitrides and carbides. The particles will preferably be chosen from oxides of silica, alumina, zirconium, titanium, cerium or a mixture of at least two of these oxides.

For example, a scattering mineral layer of about 10 μm is chosen.

The distance between the emissive face and the first sheet may be smaller than 2 mm. In particular, it is possible to use diodes of small bulk, for example chips without lenses and/or without pre-encapsulation, especially of width of about 1 mm, of length of about 2.8 mm and of height of about 1.5 mm.

The one or more luminous zones are especially peripheral zones and form one or more bands framing the glazing unit.

The light may be:

continuous and/or intermittent;

monochromatic and/or polychromatic.

By way of decorative patterns, one or more luminous bands or a peripheral luminous frame may for example be formed.

An (intermediate) product corresponding to the light-emitting glazing assembly according to the invention without the light-extracting means may be sold to the user or final customer who may himself produce the light-extracting means, which will especially be erasable or removable, for example using a sticker or even a suitable marker pen. The invention also relates to a process for manufacturing a light-emitting glazing assembly such as described above in which the fastening part is fastened to the first seal while the latter is still in the adhesive state (first method of manufacture) or in which the fastening part is adhesively bonded to the second face (preferably) and/or to an insert between the second face and the third face and the first seal is applied which then makes contact with the fastening part (and the insert and the third face).

The manufacturing process (first method of manufacture) may comprise the following steps in order, after the fastening part has been fastened to the first seal while the latter is still in the adhesive state:
- a cavity is formed bounded by the injection edge face, the fastening part and the bottom part forming a lateral projection of the fastening part, said cavity extending along the injection edge face and opening laterally;
- the light source and the source carrier are housed in the cavity;
- the cavity is closed with a cap in the longitudinal direction of the injection edge face, the cavity remaining open laterally; and
- the framing profile is mounted on the insulating glazing unit by adhesive bonding, with adhesive or a double-sided tape, said profile including the framing jamb facing the injection edge face.

The manufacturing process (first method of manufacture) may also comprise the following steps in order, after the fastening part has been fastened to the first seal while the latter is still in the adhesive state:
- a cavity is formed bounded by the injection edge face, the fastening part and the bottom part forming a lateral projection of the fastening part, and a cap that is an extension of the bottom part, said cavity extending along the injection edge face and opening laterally;
- the light source and the source carrier are housed in the cavity; and
- the framing profile is mounted on the insulating glazing unit by adhesive bonding, with adhesive or a double-sided tape, said profile including the framing jamb facing the injection edge face.

The manufacturing process (second method of manufacture) may comprise the following steps in order:
- a shim, especially made of a non-stick material (Teflon or polytetrafluoroethylene), is placed against the injection edge face, the shim being longer than the injection edge face;
- at least one preferably metal part forming a cap, bottom part and fastening part, is placed around the shim and adhesively fastened to the external face and to the second face and/or insert; and
- said seal is applied;
and preferably
- a framing profile is mounted on the insulating glazing unit by adhesive bonding, (preferably) with the adhesive referred to as the mounting adhesive or even with a double-sided adhesive tape, said profile including a framing jamb facing the injection edge face and adhesively bonded to the bottom part;
- the shim is removed leaving a laterally open cavity; and
- the light source and the source carrier are housed in the cavity.

Better still, for demounting (arrangements are made so that) the mounting adhesive of the optional profile is absent at least between the framing jamb and the lateral end of the cavity, and, the framing profile comprising a void capped by an impermeable cover and with sealing means, the cover and/or the sealing means being removable and forming an access flap allowing access to the source and this assembly preferably allowing electrical power cables to be run to the source,
- the cover and/or the sealing means are removed; and
- the source is removed via the lateral end of the cavity.

The void is preferably in said jamb adjacent to the jamb facing the injection edge face.

The fastening part and/or the bottom part or even the second edge may protect the light source from misalignment and/or from being crushed against the injection edge face.

Figure 4A:
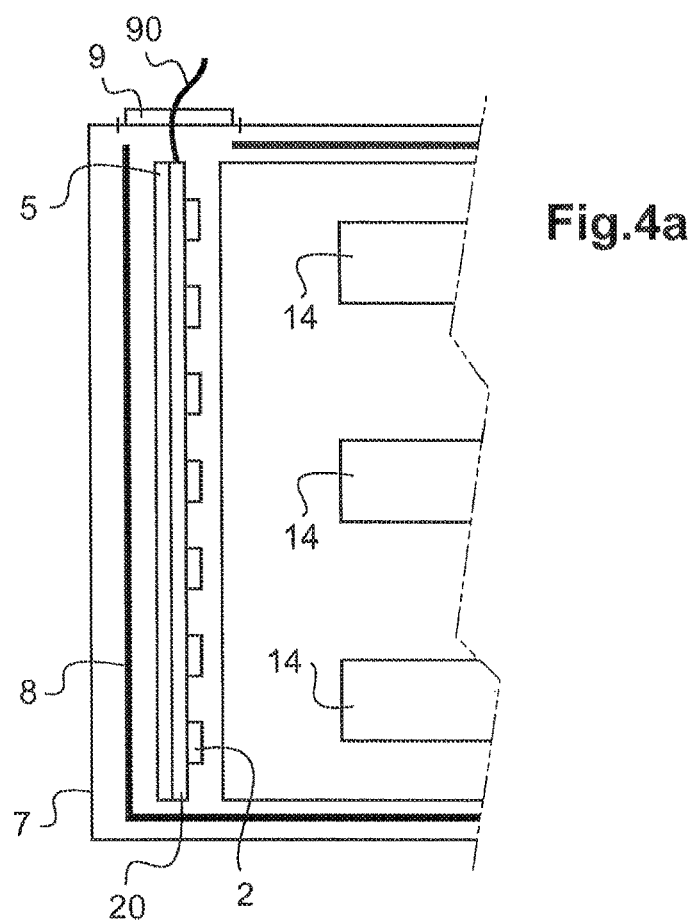
Figure 4B:
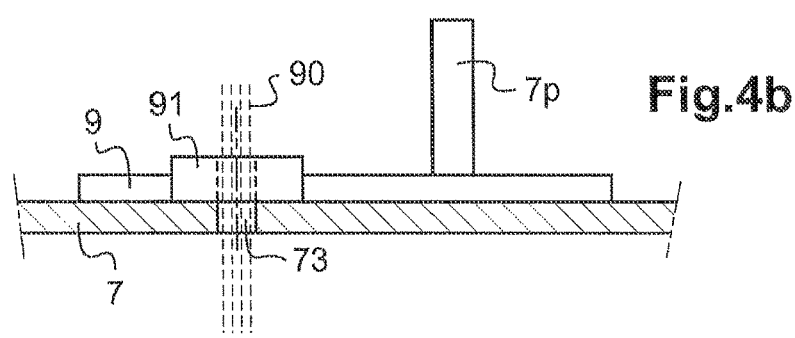
Figure 4C:
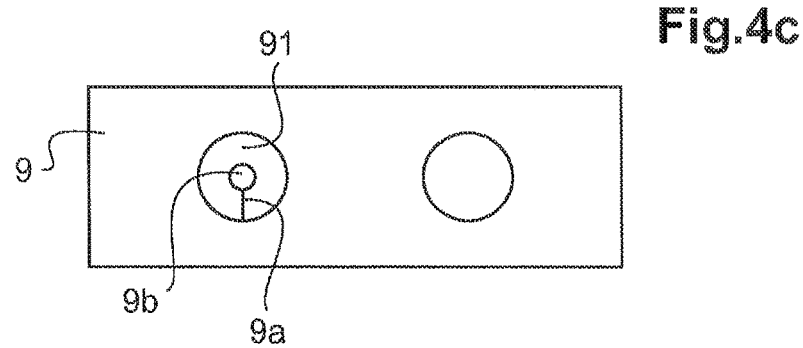

Other details and advantageous features of the invention will become apparent from reading the examples of glazing units according to the invention, which are illustrated by the following figures:

FIG. 1a shows a light-emitting refrigerated enclosure;

FIGS. 1, 1', 1bis, 2, 2', 2", 3, 3a, 3b, 3c, 3d, 3', 5a to 5g, 6, 7, 8, 9, 10 and 11 show schematic and partial cross-sectional views of light-emitting glazed doors for pieces of refrigerating equipment in various embodiments of the invention;

FIG. 1" is a detail view of the cap used to close the cavity used in FIG. 1 longitudinally fastened in place;

FIG. 4a shows a schematic front view of a light-emitting glazed door for a piece of refrigerating equipment with an access flap allowing access to the light source; and FIGS. 4b and 4c show the access flap.

It will be noted that for the sake of clarity the various elements of the objects shown are not necessarily to scale.

FIG. 1a shows a schematic view of a refrigerated enclosure 1000 in a first embodiment of the invention.

This chamber is here a cabinet comprising shelves 101 (dotted lines) and two doors each comprising a light-emitting insulating glazing unit comprising an external main face 11 on the user side (visible here) and an internal main face (shelf side) and an edge with four edge faces. The longitudinal edge faces of the edge are vertical. A framing profile is a frame fastened to the periphery of the rectangular insulating glazing unit (double glazing unit or even a triple glazing unit). The frame comprises four jambs that abut at the corners of the insulating glazing unit. The two longitudinal jambs 7a and 7b are identical and vertical. The two lateral jambs 7c and 7d are horizontal. Two light sources (represented by dotted lines because masked) are inserted between the first longitudinal jamb 7a and a first longitudinal edge face 13a and between the second longitudinal jamb 7b and a second longitudinal edge face, respectively.

Each door opens outward by virtue of a pivot 7p on the top and bottom jambs.

FIG. 1 shows a schematic partial cross-sectional view of a light-emitting glazed door for a piece of refrigerating equipment 100 in a first embodiment of the invention.

This light-emitting glazed door 100 comprises an insulating glazing unit having an external main face 11 on the user side and an internal main face (12' shelf side), comprising:
- a first glazing unit comprising the external face and a first edge formed from four edge faces including a first longitudinal edge face 13a, said first glazing unit here being a single glazing unit comprising a first glass sheet 1 having a first main face 11 and a second main face 12, the first face therefore being the external face, for example a sheet of extra-clear soda-lime-silica glass of thickness equal to at least 3.8 mm (4 mm or 6 mm as standard) is used;

a second glazing unit comprising the internal face 12' and a second edge formed from four edge faces including a second longitudinal edge face 13'$a$, said second glazing unit here being a single glazing unit comprising a second glass sheet 1' having a third face 11' and a fourth main face 12' that here is the internal face the second and third faces being spaced apart by a first gas-filled cavity; and on the periphery of the second and third faces a polymeric first seal 3 forming a frame, and an insert forming a spacer 3'.

Conventionally, the insert 3' is fastened to the interior of the glazing unit by its lateral faces to the faces 12, 11' of the glass sheets by butyl rubber 81 that also plays the role of sealing the interior of the insulating glazing unit from water vapor. The insert 3' is placed set back into the interior of the glazing unit and in proximity to the longitudinal edge faces of the edges of said glass sheets, so as to provide a peripheral groove into which a first polymeric seal 3 is injected, this polymeric seal being made of a mastic, such as a polysulfide or polyurethane mastic. The mastic confirms the mechanical assembly of the two glass sheets 1, 1' and creates a seal to solvents or to liquid water.

A light source 2 is external to the insulating glazing unit. Light-emitting diodes 2 are preferred each comprising a semiconductor chip with an emissive face 21.

The diodes are optically coupled to the first longitudinal edge face 13$a$, which is referred to as the injection edge face, in order to propagate light by total internal reflection in the thickness of the first glazing unit, which then plays the role of a light guide. The diodes are on a printed circuit board or PCB carrier 20 and extend facing the first edge face (the injection edge face) 13$a$.

The PCB carrier 20 is of unitary construction, thin, of thickness equal to 1.8 mm, and of 5 mm width. It is a rectangular bar (strip), i.e. a bar of rectangular cross section, and is of "FR-4" type or made of metal. The PCB carrier 20 does not extend beyond the first edge in the direction of the external face and here is on a metal in order to dissipate heat.

The light-emitting diodes each comprise an emissive chip able to emit radiation at one or more wavelengths in the visible, said radiation being guided by the first sheet 1. The diodes are small, typically being a few mm or less in size, and conventionally have a thickness of at most 2 mm, especially being about 2×2×1 mm in size. The diodes optionally comprise optics (a lens) and are either not pre-encapsulated, in order to decrease their bulk as much as possible, or are encapsulated, for example in a single resin. The emissive faces are preferably spaced apart from the injection edge face and do not make adhesive contact thereto, but may be pre-encapsulated and adhesively bonded with an adhesive or double-sided optical tape, preferably of at most 0.5 mm in thickness. It is possible to choose diodes emitting light that is white or colored.

The distance between the emissive face and the injection edge is as small as possible, for example 5 mm and better still 0.2 to 2 mm. The main emission direction is the direction perpendicular to the face of a semiconductor chip, which may for example have a multiple quantum well (MQW) active layer fabricated in AlInGaP or another semiconductor technology. The emission cone is a Lambertian cone of ±60°. In the configuration illustrated, the emissive face 21 of the chip is perpendicular to the PCB 20.

The light 12' is extracted for example via the external face 11. The extraction 14' is achieved by any scattering means on the surface: sandblasting, acid etching, scattering layer such as a white enamel, etc. or as a variant by laser etching in the first sheet 1. The luminous pattern may have a commercial purpose, form a sign, etc.

The second glazing unit 1' comprises a first layer 15 providing a thermal function, on the third face 11'.

The PCB carrier 20 and the light source 2 are located in a cavity bounded by the injection edge face 13$a$, a part referred to as the fastening part 4 and a bottom part 5 and closed by a longitudinal cap 6. This elongate cavity opens laterally.

The fastening part 4 is a metal profile, here an—extruded or bent—plate made of aluminum of thickness Ep4 of 1.5 mm forming a hollow part of rectangular cross section of thickness E4 of 7 mm. This profile 4 is mounted on the mastic 3 while it is still in its adhesive state (the glazing unit generally being horizontal), so that the external edge face of the mastic 31 makes direct adhesive contact with the fastening part, which may typically penetrate by 1 to 3 mm or even more into the mastic 3. The protruding thickness E'4 is therefore for example 5 mm. The fastening part 4 does not touch both the first and second glazing units in order not to form a thermal bridge. It may especially be spaced apart from the second face 12 by 2 mm so that the source carrier does not extend beyond the external face.

The fastening part 4 may protect the light source 2 from misalignment and/or from being crushed against the injection edge face—protrusion of its planar back portion 42, on the side opposite to the injection edge face.

The bottom part 5 is for its part facing and spaced apart from the injection edge face; it is here a question of a lateral projection of the fastening part, and therefore of a rectangular bar of thickness Ep5 of 1.5 mm that extends the planar back wall 42. The aluminum sheet folded or extruded to form fastening part and bottom part. The dimensions of the fastening part and of the bottom part are shown in FIG. 1".

The bottom part 5 could even be bent at an angle in the direction of the injection edge face without touching it or so as to touch it (if the fastening part 4 does not touch the second glazing unit, preferably) if the diodes on the PCB carrier are mounted by sliding via the lateral end of the open cavity.

The glazing unit furthermore comprises a cap 6 for closure of the cavity, said closure following the longitudinal direction of the injection edge face 13$a$.

The cap is a 50 to 100 μm-thick adhesive-coated metal foil 6 having a portion 62 adhesively bonded to the external face 11, thereby increasing thickness by a negligible amount of at most 1 mm, and a portion 61 adhesively bonded to the bottom part 5 via its back face.

Mention may be made for example of an aluminum foil adhesively bonded via a double-sided adhesive tape or even a metal tape with an adhesive on its injection-edge face side face. For example, the metal tape (shown in FIG. 1") comprises on this face an adhesive 85 that is covered by a protective film 65 (a lining) except in zones for adhesive bonding to the face 11 and the bottom part 5. It is for example a question of simply cutting the lining sold with the adhesive metal tape.

To insert diodes after the cap has been applied or to change them the cap 6 need not necessarily be demounted because it is possible to insert or remove the diodes on their PCB carrier (or an optical fiber 2' on its carrier 20' as shown in FIG. 1*bis*) laterally preferably via the top of the door. It is also possible to insert the diodes before the cap has been applied.

Thus, the PCB carrier 20 and the diodes 2 thereon are inserted into the cavity against the bottom part, the carrier 20 making nonadhesive contact with the metal bottom part or the metal fastening part, and it may even not be fastened in any way that could prevent its possible desired removal laterally. Magnetically fastened contact is possible. There is possibly a small space between the diodes and the injection edge face if it does not disrupt optical alignment. The bottom part 5 forms a heat sink.

Forceful fitting and even a tight fit is preferably avoided.

The fastening part/bottom part/cap assembly is associated with the insulating glazing unit without creating a thermal bridge. Optionally, the cap and the fastening part reflect lateral light in order to direct some thereof toward the injection edge face.

The glazed door 100 furthermore comprises a framing profile fastened to the insulating glazing unit, preferably by an adhesive referred to as the mounting adhesive 8, and masking the first seal 3 and the insert 3'. It comprises a longitudinal (vertical on the mounted door) framing jamb 7*a* that extends along the injection edge face 13*a*, fastened to the insulating glazing unit by the mounting adhesive 8 and that thus, here, makes adhesive contact, via the adhesive, with the fastening part, the bottom part and the cap, the mounting adhesive 8 being absent from the space between the light source and the injection edge face and better still from the space between the end of the laterally (top in the mounted door) open cavity in order to make it accessible (as will be described in more detail below).

The framing jamb 7*a* is made of two portions in order to prevent the thermal bridge (if metal). A metal first portion 70 is bent at an angle (it is for example a profile of L-shaped cross section) in order to face the injection edge face and extend over the external face and comprises:
- a portion 71 adhesively bonded to the external face and to a (planar) portion of the cap serving to close the cavity; and
- a portion 72 facing the edge of the insulating glazing unit (and offset from the edge face 13'*a* of the second glazing unit), adhesively bonded to another portion of the cap 61, to the (back face 51 of the) bottom part and to the (planar back portion 42 of the) fastening part.

The second portion 70' is thermally insulating, preferably polymeric, securely fastened by an adhesive 80 to the first portion and bent at an angle in order to face the second edge 13'*a* adjacent to the injection edge and extend over the internal face 12'.

The framing profile is preferably mounted while the unit is horizontal, with the cap for closing the top portion of the cavity.

FIG. 1' shows as a variant, in a detail view, of a door 100', bottom 5 and fastening 4 parts, that are two securely fastened parts, the bottom part 5 being L-shaped and the short portion of the L being adhesively bonded via a double-sided adhesive tape 80' to a lateral portion 40 of the fastening part 4.

FIG. 2 shows a schematic partial cross-sectional view of a light-emitting glazed door for a piece of refrigerating equipment 200 in a second embodiment of the invention.

The door 200 differs from the door 100 by the choice of side-emitting diodes each of which has an emissive face parallel to the PCB carrier 20, and therefore by the position of the PCB carrier 20 that here is against the lateral portion 40 of the metal fastening part (bottom of the cavity). The fastening part may touch the face 12 of the first glazing unit (second face) for example in order to center (raise) the diodes on the middle of the guiding pane 1. Otherwise the thickness of the PCB is for example adjusted.

If the fastening part 4 is made of plastic a metal part may be inserted.

FIG. 2' shows a schematic partial cross-sectional view of a light-emitting glazed door for a piece of refrigerating equipment 200' in one variant of the second embodiment of the invention.

The door 200' differs from the door 100 by the choice of side-emitting diodes each of which has an emissive face 21 parallel to the PCB carrier 20, and therefore by the position of the PCB carrier 20 that is fastened (laterally demountable or not) to the cap 6' closing the cavity, which here is an extension of the bottom part, which is of unitary construction with the fastening part 4 (metal part such as an aluminum plate) of thickness Ep4 of 1.5 mm or less. The thickness of the cap Ep6 (or even the bottom part 5) may even be at most 1 mm and even at most 0.8 mm in order not to increase thickness on the external face 11. The monolithic part is for example an extrudate. The part forming the cap 6' is adhesively bonded with an adhesive 8' to the external face 11.

Alternatively, the PCB carrier is against the fastening part or side-emitting diodes are again used with the PCB carrier against the fastening part 3. This makes it possible to avoid having to fasten the PCB carrier.

If the thickness of the part of unitary construction forming the bottom part, fastening part and cap is decreased below 1 mm, it is preferable for the second glazing unit to extend beyond the first in order to protect the diodes during their insertion before the framing jamb has been installed, in a first method of manufacture.

FIG. 2" shows a schematic partial cross-sectional view of a light-emitting glazed door for a piece of refrigerating equipment 200" in another variant of the second embodiment of the invention.

The door 200' differs from the door 100 by the choice of side-emitting diodes each of which has an emissive face 21 parallel to the PCB carrier 20, and therefore by the position of the PCB carrier 20 that is fastened (laterally demountable or not) to the cap 6' closing the cavity that here is an extension of the bottom part 5. The thickness of the cap Ep6 (or even of the bottom part 5) is at most 1 mm and even at most 0.8 mm in order not to increase thickness on the external face 11. The unitarily constructed cap/bottom part is for example an extrudate.

The bottom part 5 is separate from the fastening part 4 and is fastened by adhesive bonding 8' via a lip to the lateral face 40. The part forming the cap 6' is adhesively bonded with an adhesive 8' to the external face 11.

FIG. 3 shows a schematic partial cross-sectional view of a light-emitting glazed door for a piece of refrigerating equipment 300 in a third embodiment of the invention.

The door 300 differs from the door 100 by the dimensions of the second glazing unit 1' the second edge 13'*a* of which extends beyond the injection edge face 13*a* and protrudes past the source carrier 20, and even the fastening part 4 and the bottom part 5 and the cap on the back face of the bottom part, said protrusion being on the side opposite the injection edge face and protecting the light source especially from misalignment and/or from being crushed against the injection edge face.

The second edge is closer to the polymeric portion of the framing profile 7*a*.

It may protrude past the back of the fastening part by 1 mm and by at most 3 mm, for example in order not to increase the thickness of the glazing unit.

FIG. 3' shows a schematic partial cross-sectional view of a light-emitting glazed door for a piece of refrigerating equipment 300' in a variant of the third embodiment of the invention.

The door 300' differs from the door 300 by the cross section of the framing jamb 7, which does not comprise a lip on the internal face 12' and is especially of L-shaped cross section. Furthermore, the internal face 12 comprises means 17 for masking the first seal 3 and the insert 3', namely an enamel that is sufficiently opaque, for example a black or white enamel of optical density equal to 3.

A hybrid solution consists in a profile 70' that extends only a small distance over the internal face and that does not completely mask the peripheral means 3 and 3', the masking means, consisting of a deposited layer, then ensuring that they are completely masked.

Figure 3A:
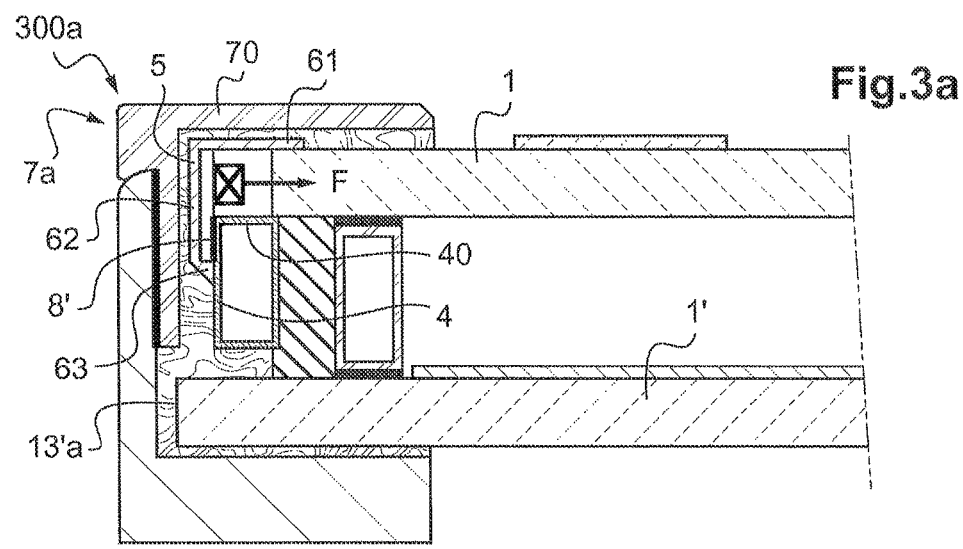

FIG. 3a shows a schematic partial cross-sectional view of a light-emitting glazed door for a piece of refrigerating equipment 300a in a variant of the third embodiment of the invention.

The door 300a differs from the door 300 by the cap, which extends to form the bottom part 5, 62 and which comprises a portion 63 that even extends as far as to fasten to the back face 42 of the fastening part.

The PCB carrier is therefore premounted on the back face of the fastening part.

In a demountable variant, the PCB carrier is against the lateral face 42 and the cap makes contact via its edge with the carrier, said contact preferably being nonadhesive. A plastic part bent at a right angle (with an internal reflector) and fastened to the back face 40 of the fastening part is then chosen.

Figure 3B:
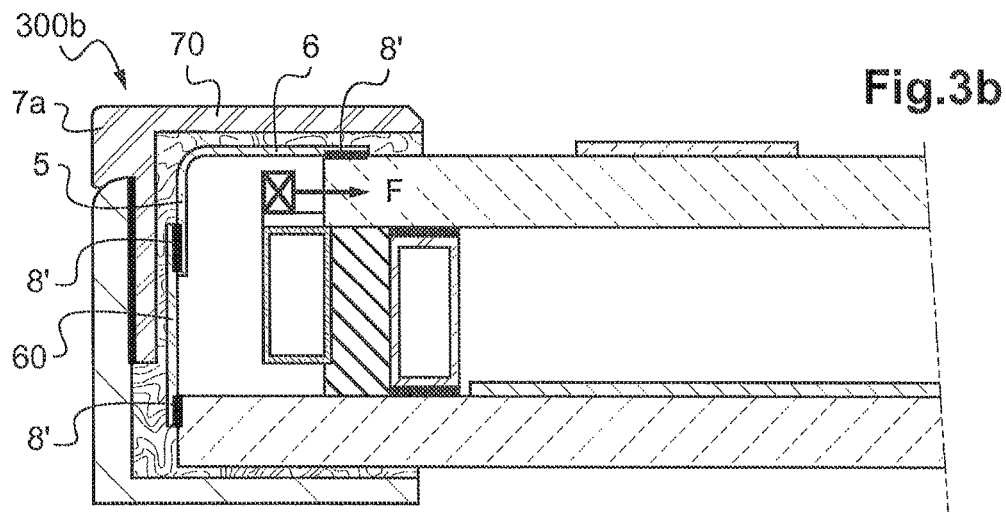

FIG. 3b shows a schematic partial cross-sectional view of a light-emitting glazed door for a piece of refrigerating equipment 300b in a variant of the third embodiment of the invention.

The door 300b differs from the preceding door 300a by the cap 6, the metal portion of which, which extends to form the bottom part 5, is spaced apart from the fastening part and from the source carrier that is placed on the lateral portion of the fastening part. This metal sheet makes adhesive contact (via an adhesive 8' or double-sided tape) with a plastic sheet that is fastened by adhesive bonding (adhesive 8' or double-sided tape) to the edge 13'a of the second glazing unit 1'.

Figure 3C:
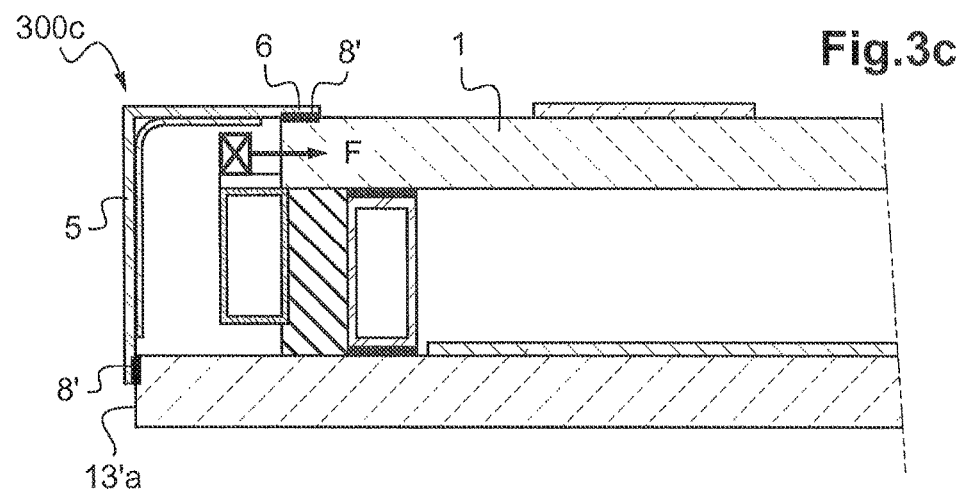

FIG. 3c shows a schematic partial cross-sectional view of a light-emitting glazed door for a piece of refrigerating equipment 300b in a variant of the third embodiment of the invention.

The door 300b differs from the preceding door 300a by a plastic part having a reflective film on its surface (except at its ends) bent at a right angle and adhesively bonded to the external face 11, for example by a double-sided tape 8', and into the edge 13'a of the second glazing unit 1', for example by a double-sided tape 8'.

Figure 3D:
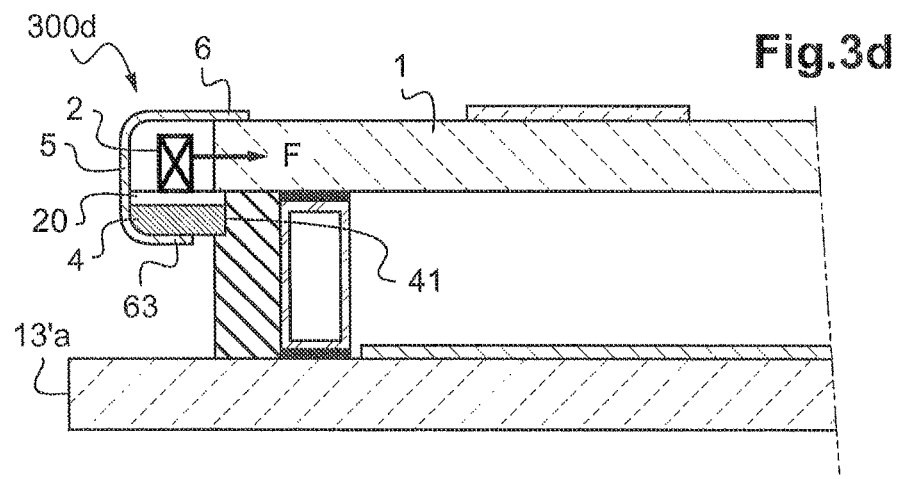

FIG. 3d shows a schematic partial cross-sectional view of a light-emitting glazed door for a piece of refrigerating equipment 300b in a variant of the third embodiment of the invention.

The door 300b differs from the preceding door 300d in that the source carrier makes direct adhesive contact with the mastic 3 as does the metal fastening part, here a profile of rectangular cross section. The cap 6 is an adhesive-coated metal foil starting on the external face 11 and extending as far as the lateral face 43 opposite the face 40. As in FIG. 1", it may comprise a protective film on the cavity side. As a variant, the source carrier is demountable and therefore is not adhesively bonded to the first seal.

FIG. 4a shows a front schematic partial view of a light-emitting glazed door for a piece of refrigerating equipment 100" in a variant of the first embodiment of the invention with an access flap allowing access to the diodes on their PCB carrier.

The framing profile comprises a void 73 capped by an apertured cover part 9 sealed with sealing means such as a seal 91, shown in detail in FIG. 4b (cross-sectional view) and FIG. 4c (top view). The seal 91 is here pierced in the center (orifice 9b), in order to allow electrical power cables 90 to be run to the source, and radially (orifice 9a) to remove the wires. The seal is also removable and forms an access flap allowing access to the source. The cover 9 is for example adhesively bonded to the top (horizontal) framing jamb and may also comprise a pivot 7p.

FIGS. 5a, 5b, 5c, 5d, 5e, 5f, 5g, 5i and 6 show schematic partial cross-sectional views of light-emitting glazed doors for refrigerating equipment in a variant of the first embodiment of the invention.

These doors differ by the cross section of the fastening part (though they all have a lateral portion 40 and a portion 41 making direct adhesive contact with the mastic), which is of open cross section. Some differ in that the lateral portion 40 opposite the portion 40 has been omitted (part 4a in FIG. 5a, part 4d in FIG. 5d, part 4e in FIG. 5e and part 4h in FIG. 5h).

The part 4b is C-shaped (FIG. 5b), the part 4c is in the shape of an H at 90° (FIG. 5c) defining two zones of contact (fastening zones) 41a and 41b with the mastic 3 and comprising a for example planar portion 40' parallel to the portion 40 and closer to the second glazing unit. Likewise, the part 4i is of U-shaped (or C-shaped) cross section and comprises two lateral projections forming two bottom parts 5. Here another PCB carrier and set of diodes face the second glazing unit (cavity closed by another cap 6a). The portion 40 or the portion 40' may almost touch the associated glazing unit but both preferably do not if the part is made of metal in order to avoid creating a thermal bridge.

Figure 5A:
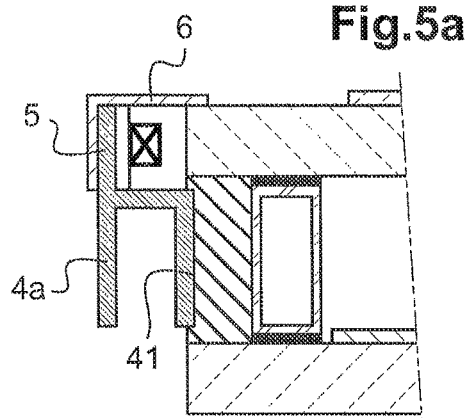
Figure 5B:
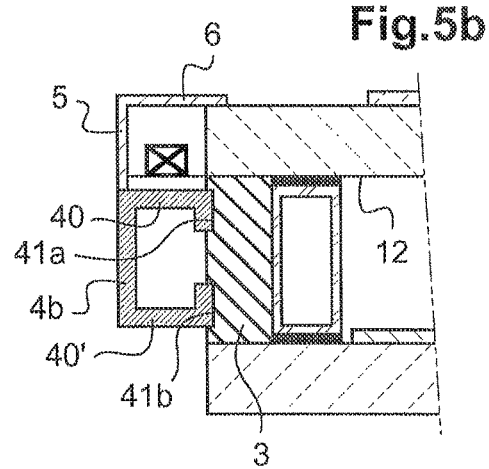
Figure 5C:
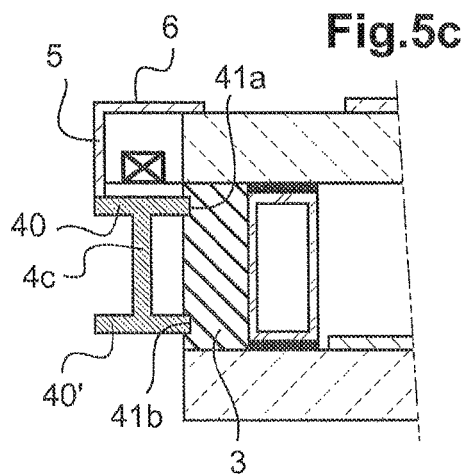
Figure 5D:
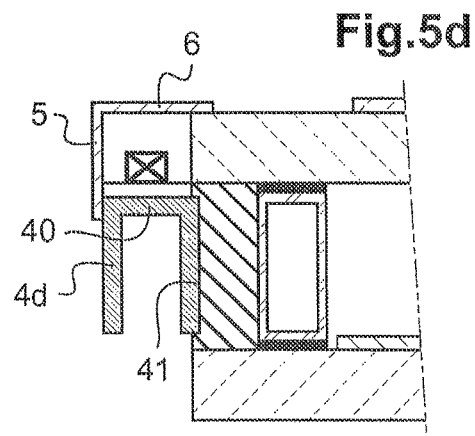

In FIG. 5d the bottom part 5 is separate from the fastening part (the cap 6 is extended to form the bottom part and is fastened to the fastening part).

Figure 5E:
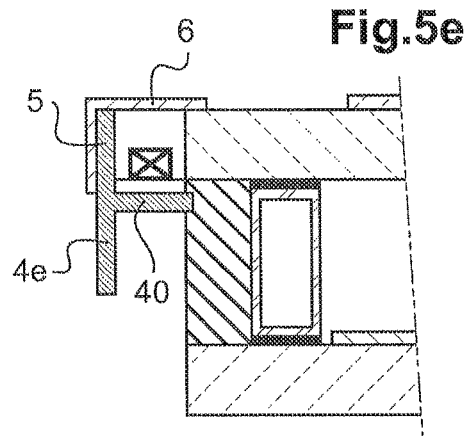

In FIG. 5e, the unitarily constructed part forming the bottom part 5 and fastening part 4e forms a T (at 90°).

Figure 5F:
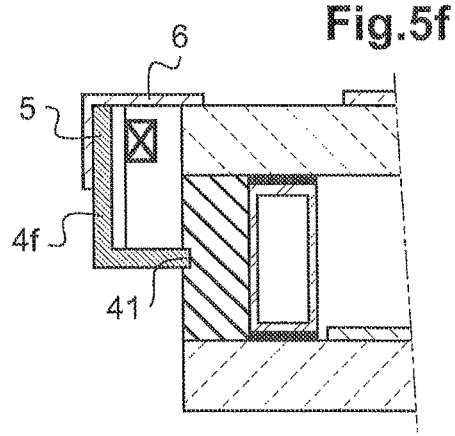

In FIG. 5f, the unitarily constructed part forming the bottom part 5 and fastening part 4f forms an L.

In FIG. 5g, the bottom part and fastening part 4g form an L and the unitarily constructed part forming the bottom part, fastening part and cap forms a C.

In FIG. 5h, the bottom part 5 and the (L-shaped) fastening part 4h form a step.

In FIG. 6, the fastening part 4i is of triangular cross section, and a second glazing unit preferably extends beyond the first in order to provide protection in particular during mounting.

The side-emitting diodes are on the lateral face 40 in FIGS. 5b, 5c, 5d, 5e and 6.

FIG. 7 shows a schematic partial cross-sectional view of a light-emitting glazed door for a piece of refrigerating equipment 700 in a variant of the first embodiment of the invention that differs in that the first glazing unit is laminated via a lamination interlayer 18 to another pane comprising the internal face (user side). In this configuration, the fastening part extends across the entire thickness of the first laminated glazing unit.

For example, light extraction may occur via the second face (gas-filled cavity side).

Other diodes have been added on the edge face opposite the injection edge face, with another fastening part, bottom part and cap.

Figure 8:
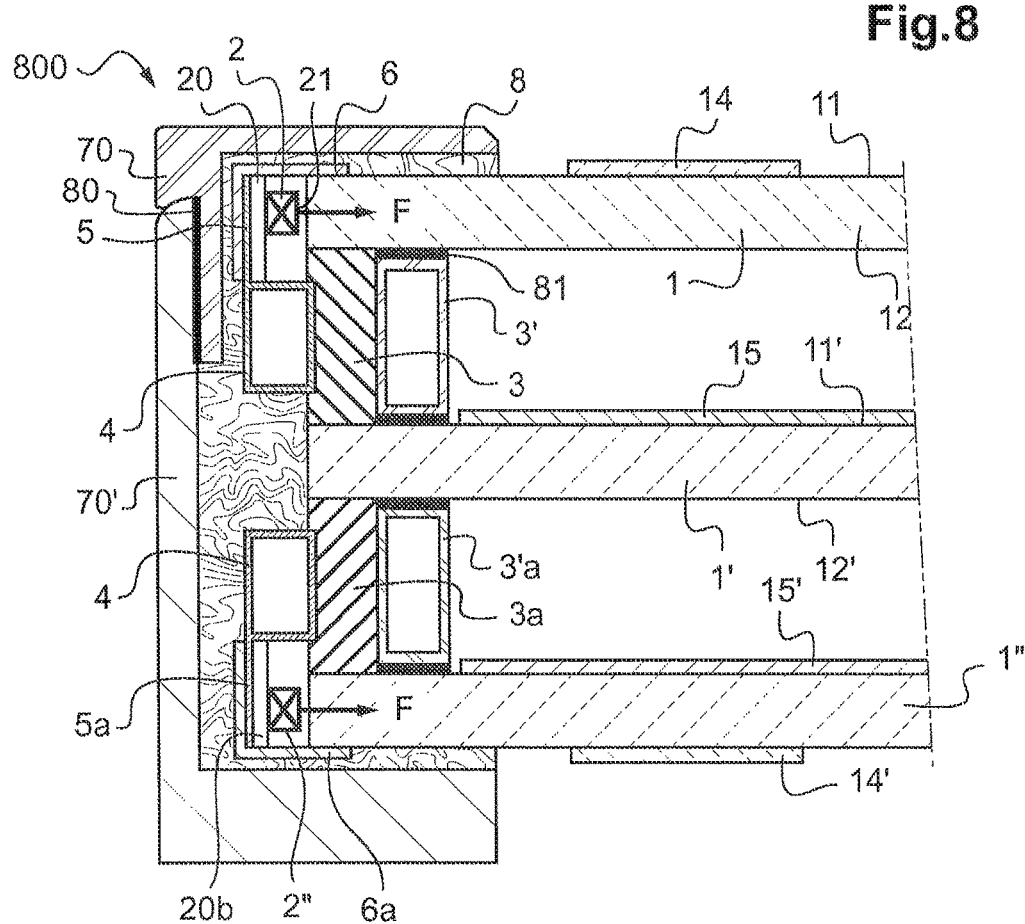

FIG. 8 shows a schematic partial cross-sectional view of a light-emitting glazed door for a piece of refrigerating equipment 800 in one variant of the first embodiment of the invention that differs in that the glazing unit is a triple glazing unit with a second gas-filled cavity and a second mastic seal 3*a* and insert 3'*a*.

The face 12' is no longer the face closest to the interior of the enclosure. The third glazing unit 1" comprises a layer 15 providing a thermal function (gas-filled cavity side). Other diodes 2" on a PCB 20*b* have been added to the edge face of the third glazing unit adjacent to the injection edge face, with another fastening part 4, bottom part 5*a* and cap 6*a*.

In a first method for manufacturing the above embodiments, the fastening part is brought into contact with the mastic seal (applied beforehand) while it is still hot. In this configuration, an adhesive (adhesive or double-sided tape) is not used to fasten the fastening part to the mastic and it is not necessary to provide one or more insets for receiving this fastening part. The fastening part may extend as far as to almost make contact with the inserts.

In a second method of manufacture (pertaining to the following embodiments) the fastening part (profile of any shape, a simple strip or a profile of U-shaped cross section) is adhesively bonded to the first face and the first seal is applied, the seal then making contact with the fastening part (and of course with the insert and with the first and second glazing units).

More precisely, this second method comprises the following steps:
- a shim (of square or preferably rectangular cross section) preferably made of a non-stick material (Teflon) is placed against the injection edge face, the shim being longer than the injection edge face;
- at least one preferably metal part forming a cap, bottom part and fastening part, is placed around the shim and adhesively fastened to the external face and to the second face;
- said seal is applied (making direct adhesive contact once set);
- a framing profile is mounted on the insulated glazing unit by adhesive bonding, with the adhesive referred to as the mounting adhesive or even with a double-sided adhesive tape, said profile including a framing jamb facing the injection edge face and adhesively bonded to the bottom part;
- the shim is removed leaving a laterally open cavity; and
- the light source and the source carrier are placed in the cavity via a lateral end.

Figure 9:
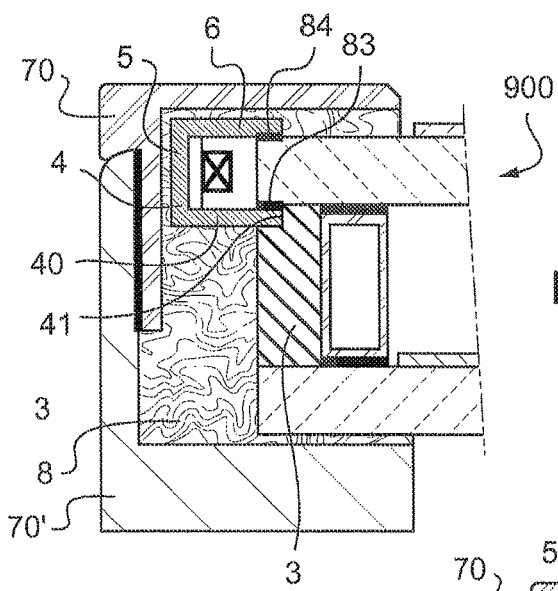

FIG. 9 shows a schematic partial cross-sectional view of a light-emitting glazed door of a piece of refrigerating equipment 900 in another embodiment of the invention.

The door 900 differs from the door 100 in that the bottom part extends to form a cap. A bent metal sheet that is adhesive coated in order to be adhesively bonded by an adhesive 83, 84 or a double-sided tape to the first and second faces of the first glazing unit is for example chosen.

As a variant an adhesive-coated metal foil with its protective film (cavity side) is chosen and therefore adhesively bonded to both faces of the first glazing unit.

The PCB could also be on the portion 40 and the diodes top-emitting diodes.

Figure 10:
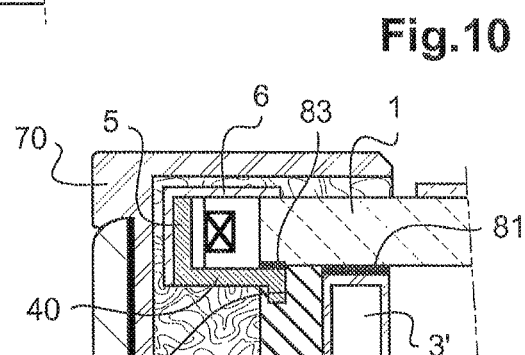

FIG. 10 shows a schematic partial cross-sectional view of a light-emitting glazed door of a piece of refrigerating equipment 910 in another embodiment of the invention.

The door 920 differs from the door 9100 in that the cap 6 is a separate part (adhesive-coated metal foil for example) that is adhesively bonded to the back face of the bottom part. The portion 41 is not the edge of the portion 41 but a perpendicular lip.

As a variant an adhesive-coated metal foil with its protective film (cavity side) is chosen and therefore adhesively bonded to both faces of the first glazing unit.

The PCB could also be on the portion 40 and the diodes top-emitting diodes.

Figure 11:
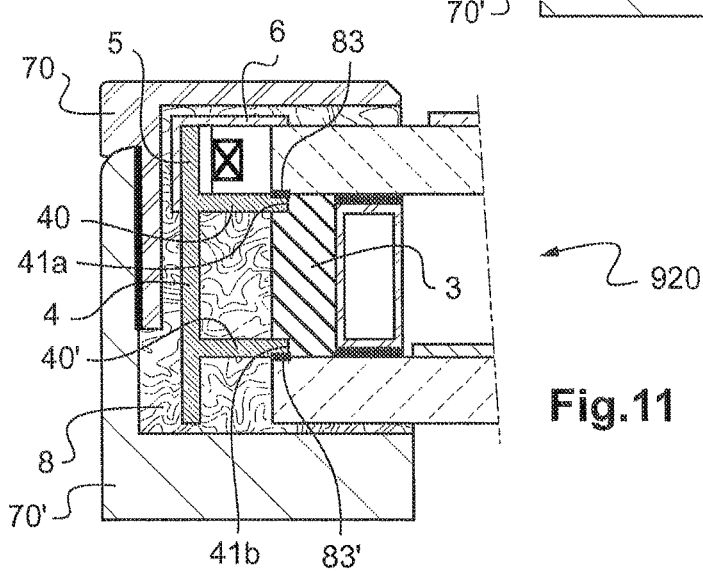

FIG. 11 shows a schematic partial cross-sectional view of a light-emitting glazed door of a piece of refrigerating equipment 920 in another embodiment of the invention.

The door 920 differs from the door 910 by the shape of the fastening part which comprises, in addition to the planar lateral portion 40 the edge 41*a* of which makes direct adhesive contact with the mastic 3, another planar lateral portion 40 the edge 41*b* of which makes direct adhesive contact with the mastic 3 and which is optionally adhesively bonded to the second glazing unit by an adhesive 83'. The fastening part also has another projection facing the edge of the second glazing unit.

The PCB could also be on the portion 40 and the diodes top-emitting diodes.

The part 6 could be an extension of the bottom part.

The invention claimed is:

1. A light-emitting glazing assembly for a door for a piece of refrigerating equipment comprising an insulating glazing unit having an external main face and an internal main face, the insulating glazing unit comprising:
- a first glazing unit comprising the external main face and a first edge face, said first glazing unit including a first glass sheet having a first main face and a second main face;
- a second glazing unit comprising the internal main face and a second edge face, said second glazing unit including a second glass sheet, having a third main face and a fourth main face, the second and third main faces being spaced apart by a first gas-filled cavity;
- on a periphery of the second and third main faces, a first polymeric seal forming a frame;
- a light source external to the insulating glazing unit, said source being chosen from:
  - light-emitting diodes each comprising a semiconductor chip having an emissive face, and
  - an optical fiber having a lateral portion forming an emissive zone,
said light source external to the insulating glazing unit being optically coupled to an injection edge face that corresponds to the first edge face, in order to propagate light by total internal reflection in a thickness of the first glazing unit, which then plays the role of a light guide;
- a source carrier bearing the light source and not extending beyond the first edge face in a direction of the external main face and, which, for said light source being the light-emitting diodes, is a printed circuit board; and
- a light extracting device configured to extract guided light, associated with the first glazing unit, in order to form at least one luminous zone;
- a fastening part that makes direct adhesive contact with the first polymeric seal, the fastening part adjacent to the injection edge face, and the fastening part being a profile placed along the periphery of the injection edge face; and a bottom part facing and spaced apart from the injection edge face, the light source being housed between the bottom part and the injection edge face.

2. The light-emitting glazing assembly as claimed in claim 1, wherein the fastening part comprises one or more portions that are spaced apart and that make direct adhesive contact with the first polymeric seal along the injection edge face.

3. The light-emitting glazing assembly as claimed in claim 1, wherein the fastening part is made of metal and does not make contact both with the first glazing unit and the second glazing unit.

4. The light-emitting glazing assembly as claimed in claim 1, wherein the first polymeric seal is present between the fastening part and the second main face or wherein the fastening part is adhesively bonded by adhesive bonding to the second main face and/or to an insert between the second main face and the third main face.

5. The light-emitting glazing assembly as claimed in claim 1, wherein the bottom part is against or securely fastened to the fastening part or is against or securely fastened to the second glazing unit.

6. The light-emitting glazing assembly as claimed in claim 1, wherein the bottom part extends the fastening part, the bottom and fastening parts forming a part of unitary construction.

7. The light-emitting glazing assembly as claimed in claim 1, wherein the second edge face extends beyond the injection edge face so that the second glazing unit forms a protrusion that protrudes past the source carrier or the optical fiber directly on the bottom part, said protrusion being on the opposite side to the injection edge face, and the source carrier optionally makes direct adhesive contact with the first polymeric seal.

8. The light-emitting glazing assembly as claimed in claim 1, wherein a cap closes a cavity bounded by the injection edge face, the fastening part and the bottom part, said cavity housing the light source and the source carrier, said cap extending along a longitudinal direction of the injection edge face.

9. The light-emitting glazing assembly as claimed in claim 8, wherein the cavity opens laterally.

10. The light-emitting glazing assembly as claimed in claim 8, wherein the cap has a portion against or adhesively bonded to the external main face, the portion having a thickness of at most 1.5 mm.

11. The light-emitting glazing assembly as claimed in claim 8, wherein the cap has:

a portion adhesively bonded to the external main face, the portion having a thickness of at most 1 mm, wherein the cap extends to form the bottom part;

and wherein the bottom part is against or securely fastened to the fastening part or wherein the bottom part is spaced apart from the fastening part and extends in order to be against or adhesively bonded to the second glazing unit.

12. The light-emitting glazing assembly as claimed in claim 8, wherein the cap extends the bottom part which is then bent at an angle, an assembly formed by the fastening part, the bottom part and the cap being a part of unitary construction, a portion of the cap being against or adhesively bonded to the external main face.

13. The light-emitting glazing assembly as claimed in claim 8, wherein the light source and the source carrier do not make adhesive contact in the cavity.

14. The light-emitting glazing assembly as claimed in claim 1, further comprising a framing profile comprising a framing jamb facing the injection edge face and positioned on at least the internal or the external main face, the bottom part being between the framing jamb and the injection edge face and fastened to the insulating glazing unit, no adhesive being present in the space between the light source and the injection edge face.

15. The light-emitting glazing assembly as claimed in claim 14, wherein the framing jamb comprises:

a first portion facing the injection edge face and the bottom part and extending onto the external face, adhesively bonded to the external face or to the bottom part; and a second portion, securely fastened via adhesive bonding to the first portion, facing the second edge face adjacent to the injection edge face and optionally extending onto the internal face, adhesively bonded to the internal face or to the fastening part;

one of the first and second portions being made of metal, the other being thermally insulating.

16. The light-emitting glazing assembly as claimed in claim 15, wherein the second edge face extends beyond the injection edge face and so that the second glazing unit forms a protrusion that protrudes past the source carrier or the optical fiber directly on the bottom part, said protrusion being on the opposite side to the injection edge face, the framing jamb does not comprise a lip on the internal main face and the internal main face comprises a masking arrangement for masking the first polymeric seal.

17. The light-emitting glazing assembly as claimed in claim 14, wherein the framing profile comprises a void capped by an impermeable apertured cover with a sealing device, the cover and/or the sealing device being removable and forming an access flap allowing access to the light source.

18. The light-emitting glazing assembly as claimed in claim 17, wherein the cover is a part fastened to the framing profile and furthermore comprising a pivot.

19. The light-emitting glazing assembly as claimed in claim 17, wherein the framing profile is adhesively bonded by an adhesive to the insulating glazing unit and the adhesive is absent between the access flap and a lateral end closest to an open cavity closable by a cap and bounded by the injection edge face, the fastening part and the bottom part, said cavity housing the light source and the source carrier, said cap extending along a longitudinal direction of the injection edge face.

20. A door for a piece of refrigerating equipment comprising a light-emitting glazing assembly as claimed in claim 1.

21. A refrigerated enclosure comprising a door for a piece of refrigerating equipment as claimed in claim 1.

22. A process for manufacturing a light-emitting glazing assembly as claimed in claim 1, comprising fastening the fastening part to the first polymeric seal while the first polymeric seal is still in the adhesive state or adhesively bonding the fastening part to the second face and/or to an insert between the second main face and the third main face and the first polymeric seal is applied, the first polymeric seal then making contact with the fastening part.

23. The process for manufacturing a light-emitting glazing assembly as claimed in claim 22, further comprising, after the fastening part has been fastened to the first polymeric seal while the first polymeric seal is still in the adhesive state:

forming a cavity bounded by the injection edge face, the fastening part and the bottom part forming a lateral projection of the fastening part, said cavity opening laterally;

housing the light source and the source carrier in the cavity;

closing the cavity is closed with a cap in a longitudinal direction of the injection edge face, the cavity remaining open laterally; and mounting a framing profile on the insulating glazing unit by adhesive bonding, with a mounting adhesive or with a double-sided adhesive tape, said framing profile including a framing jamb facing the injection edge face.

24. The process for manufacturing a light-emitting glazing assembly as claimed in claim 22, further comprising:

placing a shim against the injection edge face, the shim being longer than the injection edge face;

placing at least one part forming a cap, bottom part and fastening part, around the shim and adhesively fastened to the external main face and to the second main face and/or insert; and applying said first polymeric seal;

mounting a framing profile on the insulating glazing unit by adhesive bonding, with a mounting adhesive or with a double-sided adhesive tape, said framing profile including a framing jamb facing the injection edge face and adhesively bonded to the bottom part;

removing the shim thereby leaving a laterally open cavity; and placing the light source and the source carrier in the cavity.

25. The process for manufacturing a light-emitting glazing assembly as claimed in claim 23, wherein the mounting adhesive is absent at least between the framing jamb and a lateral end of the cavity and, the framing profile comprising a void capped by an impermeable cover and with a sealing device, the cover and/or the sealing device being removable and forming an access flap allowing access to the light source, the method further comprising removing the cover and/or the sealing device and removing the light source via the lateral end of the open cavity.

26. The light-emitting glazing assembly as claimed in claim 1, wherein the first main face is the external main face or the first glass sheet is laminated to another glass sheet or the first glazing unit is a central pane of a triple glazing unit, and wherein the fourth main face is the internal main face or the second glass sheet is laminated to another glass sheet or a third glass sheet is spaced apart from the second glass sheet by a second gas-filled cavity.

27. The light-emitting glazing assembly as claimed in claim 1, wherein the source carrier for the optical fiber is the bottom part or the fastening part directly.

* * * * *